(12) United States Patent
Ilbery

(10) Patent No.: US 8,218,908 B2
(45) Date of Patent: Jul. 10, 2012

(54) MIXED CONTENT IMAGE COMPRESSION WITH TWO EDGE DATA REPRESENTATIONS

(75) Inventor: Peter William Mitchell Ilbery, Dundas (AU)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 12/373,140

(22) PCT Filed: Nov. 1, 2007

(86) PCT No.: PCT/AU2007/001675
§ 371 (c)(1),
(2), (4) Date: Feb. 6, 2009

(87) PCT Pub. No.: WO2008/052278
PCT Pub. Date: May 8, 2008

(65) Prior Publication Data
US 2009/0245661 A1 Oct. 1, 2009

(30) Foreign Application Priority Data

Nov. 2, 2006 (AU) ................. 2006235815
Sep. 25, 2007 (AU) ................. 2007219301

(51) Int. Cl.
*G06K 9/32* (2006.01)
(52) U.S. Cl. .............. 382/299; 32/233; 32/235; 32/266; 358/3.27; 358/539
(58) Field of Classification Search ................. 382/233, 382/235, 243, 266, 299; 358/3.27, 537, 539
See application file for complete search history.

(56) References Cited

U.S. PATENT DOCUMENTS

| 5,615,287 | A | 3/1997 | Fu et al. | 382/232 |
|---|---|---|---|---|
| 5,790,269 | A | 8/1998 | Masaki et al. | 358/447 |
| 5,835,237 | A | 11/1998 | Ebrahimi | 358/448 |
| 6,151,409 | A | 11/2000 | Chen et al. | 382/166 |
| 6,226,414 | B1 | 5/2001 | Go | 382/240 |
| 6,782,287 | B2 * | 8/2004 | Grzeszczuk et al. | 600/424 |
| 6,804,406 | B1 * | 10/2004 | Chen | 382/254 |
| 7,062,093 | B2 * | 6/2006 | Steger | 382/216 |
| 7,324,701 | B2 * | 1/2008 | Nakami | 382/262 |

FOREIGN PATENT DOCUMENTS
EP   0 577 363 A1   6/1993

OTHER PUBLICATIONS

Wakin, M., et al., "Image Compression Using an Efficient Edge Cartoon + Texture Model," Proceedings of IEEE Data Compression Conference, p. 43 (2002).

(Continued)

*Primary Examiner* — Yosef Kassa
(74) *Attorney, Agent, or Firm* — Fitzpatrick, Cella, Harper & Scinto

(57) ABSTRACT

A method (200, 400) of compressing an input image (201) is described. The method (200, 400) starts by extracting image gradient data representing pixel differences along contours of the image. Next, the method forms an edge based image from the image gradient data and a low resolution image derived from the input image. The method then computes a residual image representing a difference between the edge based image and the input image, and finally compresses the input image by encoding the image gradient data, the low resolution image, and the residual image.

28 Claims, 24 Drawing Sheets

OTHER PUBLICATIONS

Carlsson, S., "Sketch Based Coding of Grey Level Images", Signal Processing, v. 15, pp. 57-83 (1988).

Ran, X., et al., "A Perceptually Motivated Three-Component Image Model—Part II: Applications to Image Compression", IEEE Transactions on Image Processing, vol. 4, No. 4, pp. 430-447 (1995).

International Search Report and Written Opinion of the International Searching Authority, PCT/AU2007/001675, Dec. 7, 2007.

International Preliminary Report on Patentability and Written Opinion of the International Searching Authority, PCT/AU2007/001675, May 14, 2009.

* cited by examiner

MIXED CONTENT IMAGE COMPRESSION WITH TWO EDGE DATA REPRESENTATIONS

TECHNICAL FIELD

The present invention relates generally to compression of digital images and, in particular, to the compression of digital images such as mixed-content continuous tone containing sharp edges. Examples of such images include images which contain computer-generated data, including text or graphics, as well as photographic image data.

BACKGROUND

There exist well established and effective methods for compressing photographic images such as DCT-based JPEG image compression (JPEG). However JPEG is not suited to compressing images which contain sharp edges such as occur in images containing text or object-based computer graphics. For such image content the size or quality of JPEG compressed images leaves a lot of room for improvement.

Many viewed and printed images contain both photographic image data and computer-generated text or graphics. There is a need in computer and printing systems to improve the compression of such mixed content images.

One approach to compressing mixed content images is to segment the image into regions which are separately coded. By performing the segmentation so that boundaries between segmented regions are aligned with sharp edges, JPEG can be used to code image data without those sharp edges. The Mixed Raster Content (MRC) standard, ITU-T Recommendation T.44 (01/2005) specifies a compressed representation for this approach to compression of mixed content images. In the MRC representation, an image is segmented so that each decompressed image pixel has its value selected from one of a set of image content 'layers' with the selection being specified by one or more bi-level mask layers. The MRC standard does not specify how to perform the segmentation which can be a difficult and compute-intensive operation. Segmentation for MRC image compression is often simplified by adopting a block-based approach.

The MRC compression model builds on well established compression algorithms by coding each MRC layer to suit the layer's content using a standard raster image coding method operating on a rectangular region of pixels. One of the important advantages of the MRC model is that segmentation can allow use of transform coding without requiring transform coding to deal with some of the extended sharp edges in an input image. This is because, when an MRC segmentation boundary follows a sharp edge of an image, decompression of an MRC compressed representation takes data from each side of the edge from separate image content layers and consequently there is no requirement to represent the sharp edge in either of the image content layers. However, this sharp edge removal has a computational and compression overhead because if the edge is not at the rectangular boundary of an image content layer then it is necessary to fill in and code image values, which are not used in the decompressed image, at the "don't care" pixel positions of the image content layers. This process of filling in image values at the "don't care" pixel positions is sometimes known as 'back filling' or 'plane filling'. To minimise transform coding of sharp edges, such fill values of an image content layer must be chosen to be similar to image values of nearby used pixel positions of the same content layer.

There exist other methods of mixed content image compression which also follow the segmentation approach and which identify regions of constant colour for lossless compression and remaining regions for compression using JPEG. These methods compress image blocks by lossless compression or JPEG compression or by a combination of lossless and JPEG compression. For those blocks applied to JPEG compression which also contain pixels extracted for lossless coding, the extracted pixels are assigned new image values equal to the average colour of un-extracted pixels. This tends to reduce the presence of sharp edges and improve JPEG compression performance.

Another approach to compressing mixed content images is known as "sketch based coding", as introduced in the paper "*Sketch Based Coding of Grey Level Images*", S. Carlsson, Signal Processing, 15, 57-83 (1988). In this approach the values of pixels on both sides of visually significant edges are coded. A "sketch image", which mimics the discontinuities at those edges but which is smooth elsewhere, is constructed which has image values for pixels between coded edges calculated as an interpolation of image values at coded edges. The residual or difference between the original image and the sketch image, now largely free of extended sharp edges, can be coded effectively by transform image compression methods such as JPEG. The calculation of the sketch image is a multi-scale and iterative interpolation process which can be time-consuming and require large memory resources.

A similar approach to image compression is to express an image as the sum of a primary image with strong edges but elsewhere smooth, a smooth image, and a texture image.

Previous methods of extracting edge data from an image for calculating an approximate image, such as those described by Carlsson, suffer from difficulties in linking isolated edges into edge runs, with the result that coding of edge data as edge runs is unable to exploit the data redundancy of edges well. This in turn results in reduced compaction and reduced quality of the approximate image.

SUMMARY

It is an object of the present invention to substantially overcome, or at least ameliorate, one or more disadvantages of existing arrangements.

In accordance with one aspect of the present disclosure, there is provided a method of compressing an input image, said method comprising:

(a) extracting image gradient data from said input image, said image gradient data representing pixel differences along contours of said input image;

(b) forming an edge based image from said image gradient data and a low resolution image derived from said input image;

(c) computing a residual image representing a difference between said edge based image and said input image; and (d) compressing said input image by encoding said image gradient data, said low resolution image, and said residual image.

In accordance with another aspect of the present disclosure there is provided a method of decompressing a compressed image to an output image, said method comprising:

(a) decoding, from said compressed image, image gradient data, a low resolution image, and a residual image;

(b) forming an edge based image from said image gradient data and said low resolution image; and (c) adding said edge based image to said residual image to form said output image.

Other aspects of the invention are also disclosed.

BRIEF DESCRIPTION OF THE DRAWINGS

One or more embodiments of the present invention will now be disclosed with reference to the following drawings, in which.

DETAILED DESCRIPTION INCLUDING BEST MODE

Figure 1:
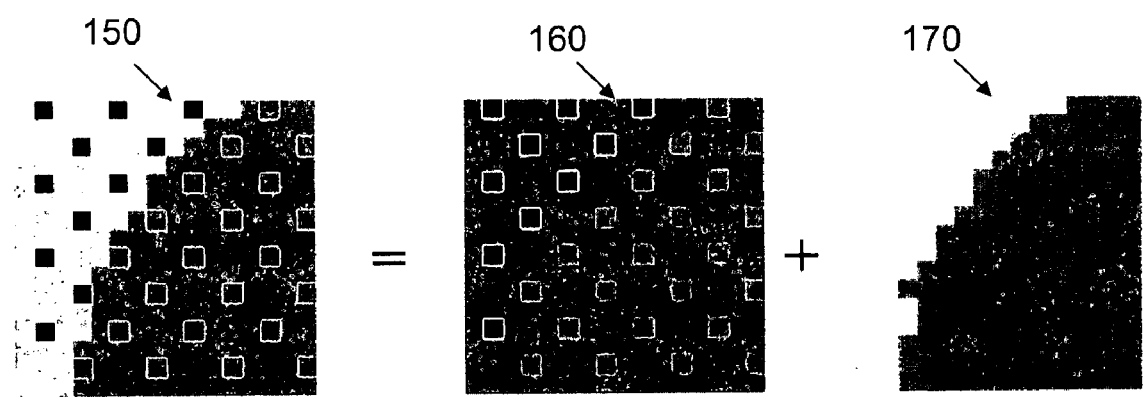
FIG. 1 illustrates by way of example a decomposition of a small input image into an 'excess values' image and an 'input less excess values' image.

Where reference is made in any one or more of the accompanying drawings to steps and/or features, which have the same reference numerals, those steps and/or features have for the purposes of this description the same function(s) or operation(s), unless the contrary intention appears.

Introduction

Compression and decompression of an image are performed on image tiles of a single colour channel of image data, with the processing for any tile being independent of the processing results for any other tile or colour channel. An image tile may be any rectangular region of the image. Tiles are preferably disjoint and cover the image. For example, a tile may be the entire image, a number of successive scanlines (or scan lines), or a square region of pixels. A tile preferably consists of a whole number of complete 8×8 blocks of image pixels. Tiles are typically processed one at a time, though they may be also processed in parallel. Preferably compression and decompression are performed on image tiles of the same size and a preferred tile size is 64 by 64 pixels. Where an image has dimensions which are not multiples of tile dimensions, the image is typically padded with zero values resulting in an image with dimensions which are multiples of tile dimensions.

Processing an image as multiple tiles is an important feature of the compression method. The compression method according to the present description adapts to the image content of the tile. Accordingly, some tiles may be coded losslessly without requiring transform coding, whereas other tiles may be coded with data loss and with the use of transform coding of residual data. Tiles which contain only text are typically coded losslessly while image tiles containing photographic image data are typically coded with data loss. The use of tiles allows the positions of non-zero data within a tile to be coded using a small number of bits. The quantisation of data within a tile can be tile specific. In the present description, quantised values are referred to as 'mapped' values.

Figure 2:
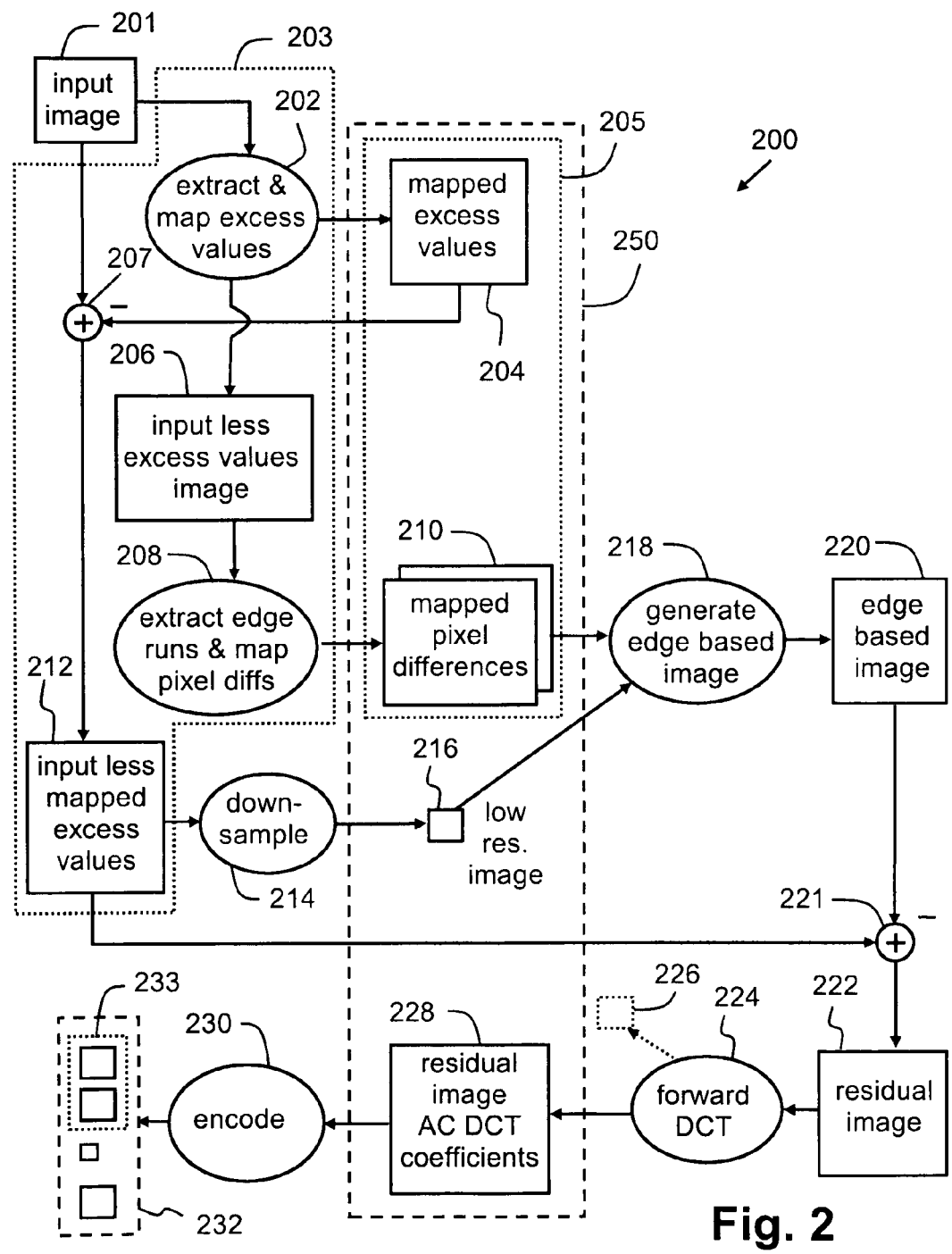
FIG. 2 is a data flow diagram of a method of image compression according to a first embodiment of the invention.
Figure 4:
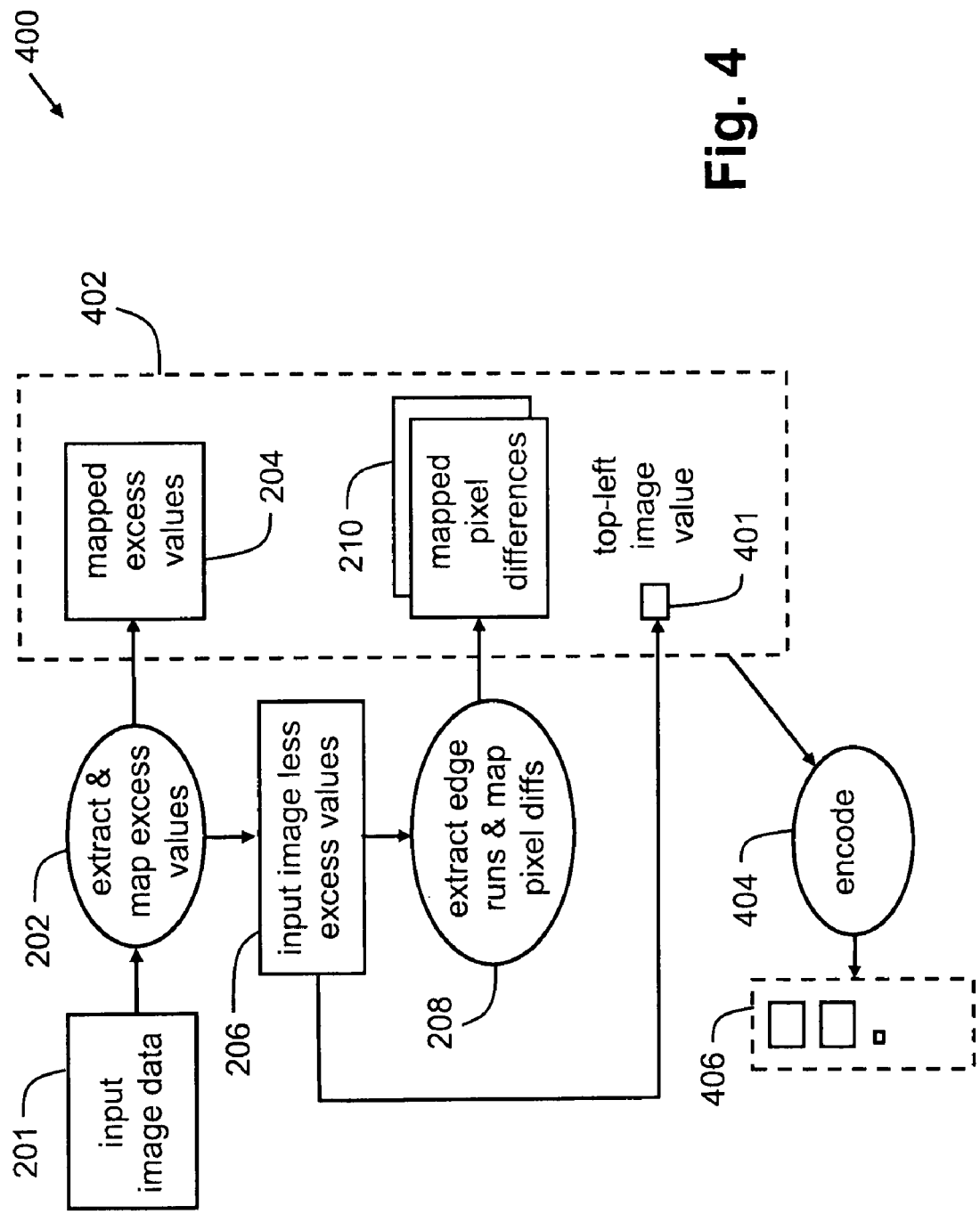
FIG. 4 is a data flow diagram of a method of image compression according to the first embodiment in the case where mapped excess values and mapped pixel differences together represent image gradient data without loss.
Figure 5:
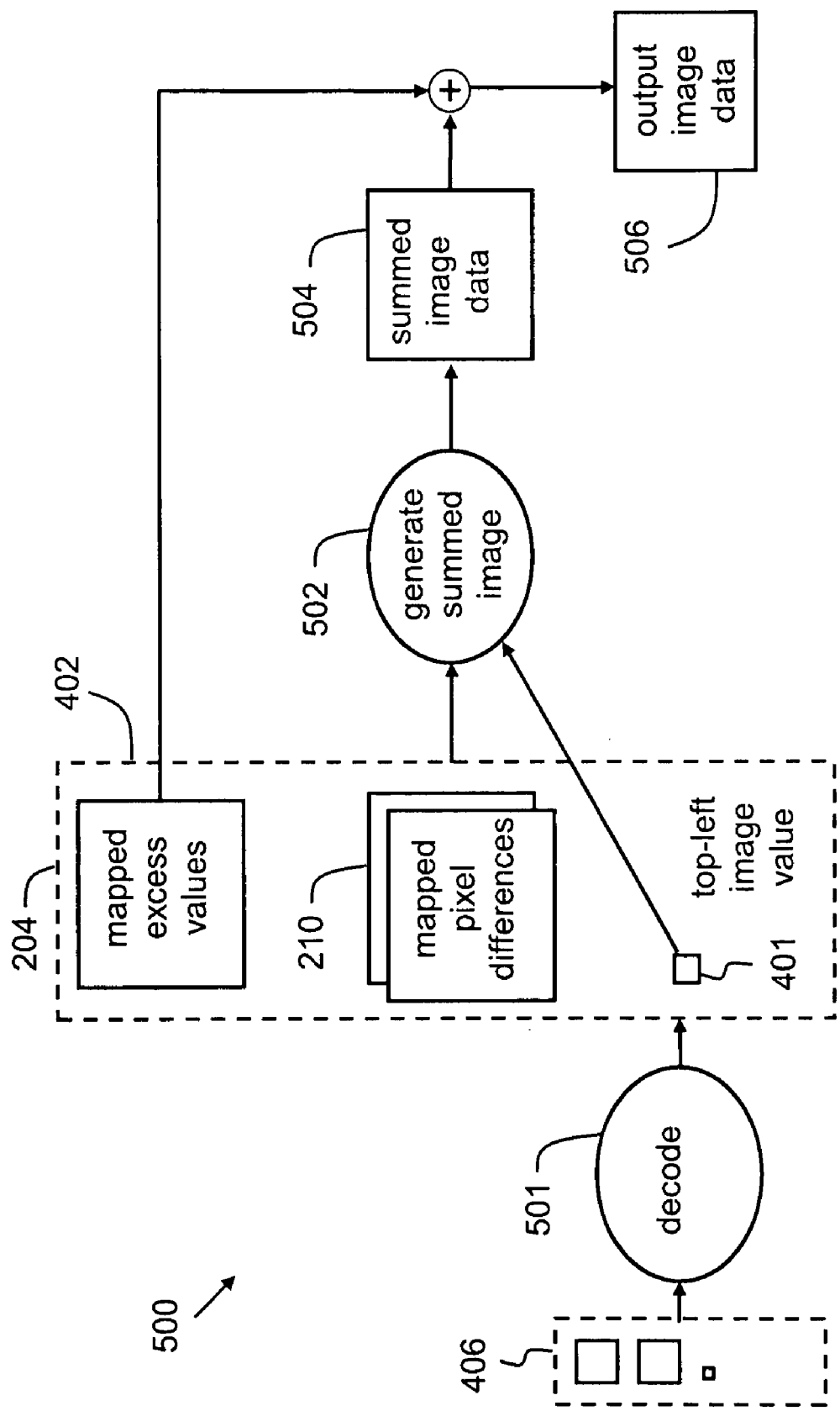
FIG. 5 is a data flow diagram of a method of image decompression which is complementary to the image compression method of FIG. 4.

The following description of compression and decompression is with respect to a tile of a single colour channel of image data. For convenience in this description the use of the word 'tile' will often be assumed, so that often the term 'image' refers to an image tile. For example, although item 201 in FIGS. 2 and 4 is often referred to as an input image and although item 312 in FIG. 3 and item 506 of FIG. 5 are often referred to as an output image, they should be understood to constitute only a tile of a full input image and a tile of a full output image.

Also for convenience compression and decompression are described operating on a single colour channel of image data where each image value is an 8 bit number with values in the range 0 to 255. However, the method is not limited to this data format.

Apparatus for Compressing and Decompressing an Image

Figure 28:
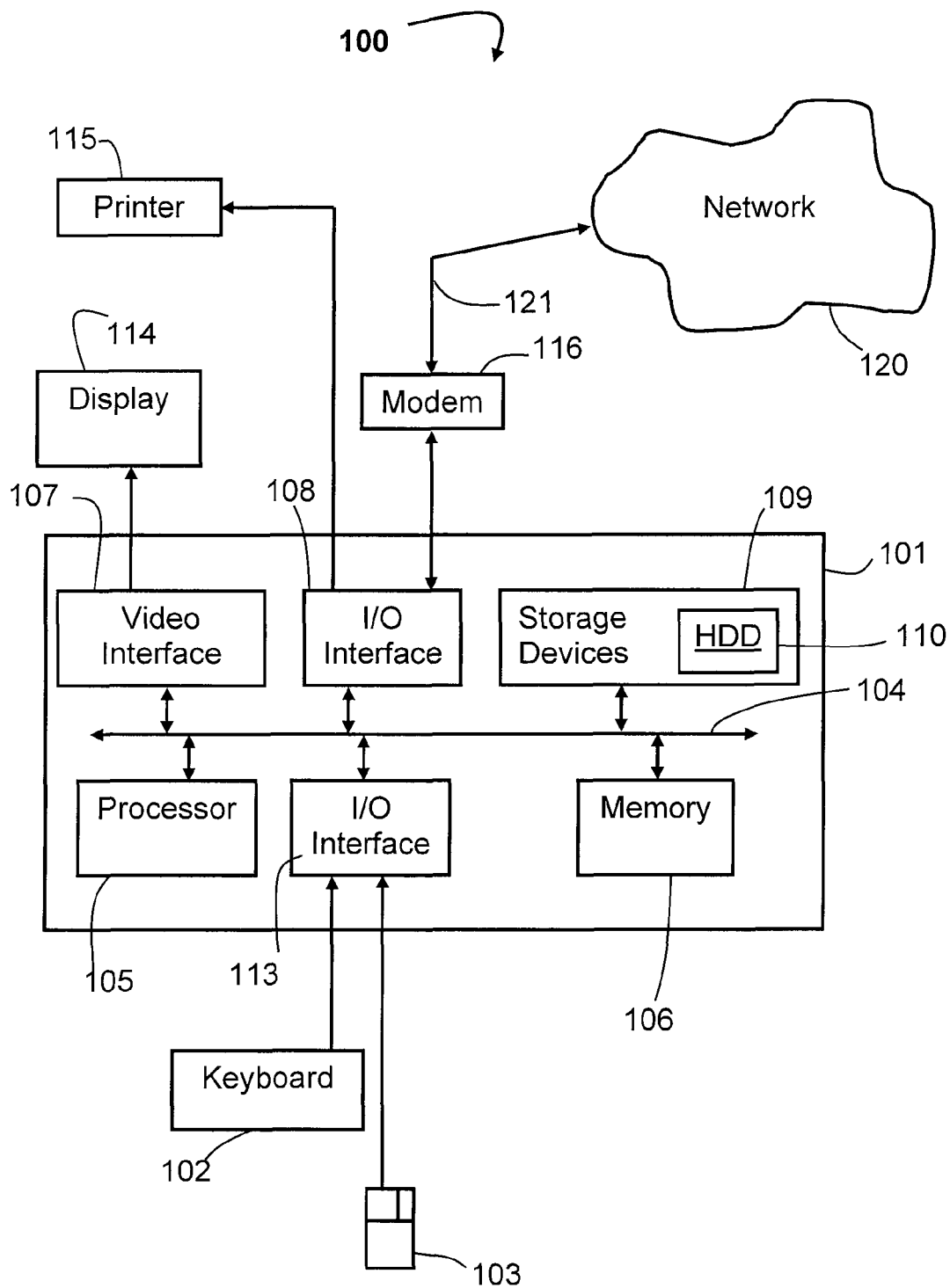
FIG. 28 is a schematic block diagram of a computer system upon which the arrangements described may be practised.

The compression and decompression of the image may be implemented using a computer system 100, such as that shown in FIG. 28 wherein the compression and decompression are implemented as one or more application programs executable within the computer system 100. The application program(s) may be stored in a non-transitory computer readable storage medium, including the storage devices described below, for example. Each application program is loaded into the computer system 100 from the computer readable storage medium, and then executed by the computer system 100. A computer readable storage medium having such software or computer program recorded on it is a computer program product. The use of the computer program product in the computer system 100 preferably effects an advantageous apparatus for compressing and decompressing the image.

As seen in FIG. 28, the computer system 100 is formed by a computer module 101, input devices such as a keyboard 102 and a mouse pointer device 103, and output devices including a printer 115, and a display device 114. An external Modulator-Demodulator (Modem) transceiver device 116 may be used by the computer module 101 for communicating to and from a communications network 120 via a connection 121, for example to send to another computer module (not illustrated) the image after compression, or to received a compressed image from another computer module for decompression by the computer module 101.

The computer module 101 typically includes at least one processor unit 105, and a memory unit 106. The module 101 also includes an number of input/output (I/O) interfaces including a video interface 107 that couples to the video display 114, an I/O interface 113 for the keyboard 102 and mouse 103, and an interface 108 for the external modem 116 and printer 115. Storage devices 109 are provided and typically include a hard disk drive (HDD) 110.

The components 105, to 113 of the computer module 101 typically communicate via an interconnected bus 104 and in a manner which results in a conventional mode of operation of the computer system 100 known to those in the relevant art.

Typically, the application programs discussed above are resident on the hard disk drive 110 and read and controlled in execution by the processor 105. Intermediate storage of such programs and any data fetched from the network 120 may be accomplished using the memory 106, possibly in concert with the storage devices 109.

The methods of image compression and decompression may alternatively be implemented in dedicated hardware such as one or more integrated circuits performing the described functions or sub-functions (e.g. forward DCT, reverse DCT, tile image generation). Such dedicated hardware may include graphic processors, digital signal processors, or one or more microprocessors and associated memories.

Overview

A monochrome image, or a colour component of a colour image, may be visualised as a terrain or relief map where the image value at a pixel describes the height above a constant height plane. Contour lines or contours are lines where the terrain has a constant height.

In the present disclosure, the border between a pair of horizontally or vertically nearest neighbour pixels is considered as a 'pixel edge segment'. For convenience a pixel edge segment is typically referred to simply as an edge. Note that such an edge is different to the 'perceived edges' of an image which may be many pixels in length and have varied widths. Where confusion is likely in the description, full terms are used to avoid the ambiguity.

Also in the present disclosure, contour lines are represented as sequences of pixel edge segments where a succeeding pixel edge segment connects to a preceding pixel edge segment at a pixel corner. Such a contour line may be closed, or it may have its two terminating pixel edge segments ending at the image boundary.

Efficient methods are described for extracting, from an input image, image gradient data at perceived sharp edges. That image gradient data is suitable for compact coding, and is suitable for generation of an approximate version of the image which reproduces to a certain extent those perceived sharp edges. The image gradient extraction methods are used to perform image compression suitable for mixed content images. The image gradient data is preferably extracted in two representations so as to be able to be compactly coded. The two representations are:

1. A pixel based representation for image gradient data along short closed contours. This image gradient data is coded as 'excess' image values for pixels inside the short closed contours as is explained in detail below; and 2. An 'edge run' based representation for image gradient data on longer contours. This image gradient data is coded in the form of an edge path and image gradient values along the edge path.

Image gradient data along short closed contours is first extracted from the input image. Image gradient data along longer contours is then extracted from the resulting 'intermediate' image which contains long contours of the input image substantially unchanged and is substantially free of such short closed contours. This approach allows efficient extraction of extended sharp edges as long edge runs from the intermediate image. The representation of image gradient data along short closed contours as pixel data and the representation of image gradient data along longer contours as edge run data together provide a compact representation of perceived sharp edges.

The first step in extracting image gradient data to form the above two representations is to decompose the input image into two component images: an 'excess values' image and an intermediate image. The sum of these two component images is preferably the input image. The two component images also decompose the contour lines of the input image. The contour lines of the excess values image are the contour lines of the input image which enclose regions of pixels with area less than a predetermined value. When a short contour line has ends terminating at the image boundary, the pixels 'inside' the contour line are considered to be the pixels of the small region isolated from the remainder of the image by the contour line. The contour lines of the intermediate image are the remaining contour lines of the input image. The decomposition separates visually significant sharp edges into data suited to coding as pixel data and data suited to coding as edge run data.

FIG. 1 illustrates a decomposition of a particular small example tile 150 containing monochrome image data. The decomposition forms a first component, being an excess values image 160, and a second component, being an intermediate image 170. The excess values image 160 contains small isolated image regions and only includes shorter contour lines. Note that the excess values image is shown with a background value of mid-grey as excess values can be positive or negative. The intermediate image 170 only contains longer contour lines. The pixel-wise sum of the excess values image 160 and the intermediate image 170 is the input image 150. The excess values image 160 is suited to a pixel-based compression method; whereas the intermediate image 170 is suited to chain coding compression methods using edge runs.

The second step in extracting image gradient data is performed on the intermediate component image. This image is substantially free of closed contours around small areas, and contains the longer contour lines of the input image substantially unchanged. Long edge runs may be efficiently and accurately extracted from this image, which leads to a compact representation of visually significant extended sharp edges. Edge run extraction is performed in two sub-steps, a 'linking' sub-step which forms edge runs and an 'assessment' sub-step which accepts or discards linked edge runs.

In the 'linking' sub-step, each pixel corner is processed once. Pairs of pixel edge segments which meet at a corner are linked based on a ranking of pixel edge segments. The highest ranked pixel edge segment at a corner and the next highest ranked, 'compatible' pixel edge segment at the corner are identified as belonging to the same edge run. Pixel edge segments linked together constitute an edge run. The linking process incrementally collects pixel edge segments into edge runs. From this process dominant edge runs emerge.

Pixel edge segments meeting at a pixel corner are considered compatible if the signs of the pixel differences for those pixel edge segments do not change as the edge run is traced through the pixel corner. By only linking compatible pixel edge segments, the sign of all pixel differences of an edge run can be specified by a single edge run 'sign' value.

In the 'assessment' sub-step, edge runs are accepted or discarded based on an aggregate score for each edge run derived from the magnitudes of the pixel differences (edge magnitudes) of the pixel edge segments of the edge run. Edge runs with a high aggregate score are considered significant and are kept, while edge runs with a low score are considered not significant and are discarded.

Overall, image gradient data is extracted as excess image values and as edge runs with an edge run sign and edge magnitude values. The extracted image gradient data is quantised prior to coding. Tile-specific quantisation mappings are used to reduce excess image values of a tile to indices into a tile-specific table of quantisation values and to reduce edge magnitude values of edge runs of a tile to indices into another tile-specific table of quantisation values.

For compression of some image tiles the quantisation of edge magnitude values of edge runs or the discarding of insignificant edge runs introduces data loss. In this case an 'edge based image' which is an approximation of the intermediate image is calculated using this quantised image gradient data and a scanline integration process.

Edge run image gradient data consists of image pixel difference data, i.e. differences of image values for horizontally or vertically nearest neighbour pixels of the intermediate image (that is, the edge run image gradient data is 'internal' to the image). To construct an image from this internal image gradient data one reference image value is required to be specified. This corresponds to supplying a 'constant of integration' when obtaining a function by integration of its derivative or when recovering a function by summing its difference values. In the disclosed compression method a low resolution (down-sampled) image provides multiple reference values for the integration process.

Where quantisation of excess image values or quantisation of edge magnitude values of edge runs introduces data loss or where edge runs are discarded, a residual image, being the input image minus quantised ('mapped') excess values and minus the edge based image, is transformed, quantised and coded using a method such as JPEG. Compression and decompression for such image tiles is described below with reference to FIGS. 2 and 3.

For compression of other image tiles, excess values are coded without loss and the pixel difference data of the intermediate image is represented without loss as coded edge runs data. In this case there is no need to code a residual image for the tile. Compression and decompression for such image tiles are described below with reference to FIGS. 4 and 5.

The tile-specific quantisation mappings are refinements of system-wide default quantisation mappings. Having system-wide default quantisation mappings tends to keep distortion below a pre-determined level across all image tiles. Transform coding of residual data is performed with system-wide quantisation settings and further works towards keeping distortion below a pre-determined level across the image. Compressing all parts of an image to the same minimum quality level is important for achieving good compression. For tiles where excess image values and/or edge magnitude values of edge runs occur as often repeated values, the use of tile-specific quantisation mappings allows improvements in image quality and reductions in compressed image size (by reducing residual data) and can at times allow lossless coding with complete avoidance of residual coding. The tables of quantisation values for a tile consist of quantisation values of default dead-zone quantisation mappings and/or values in a short list or 'palette' described more fully below. A compact description of the inverse mappings from table indices to table quantisation values is also coded per tile.

Compression with Data Loss

FIG. 2 shows a data flow diagram of a method 200 of image compression with data loss according to a first embodiment of the invention. The method 200 compresses a tile of input image data 201 for the case where there is data loss in representing excess values by mapped excess values or in representing pixel differences of the input less excess values image by mapped pixel differences or in discarding edge runs.

In FIG. 2, input image tile data 201 may be derived from storage devices 109 or from the network 120 and typically comprises data representing colour values for each pixel of the image at the particular (usually source) resolution. For the purposes of this description, unless otherwise stated, the input image is assumed to be a monochrome image with image values im[x, y] where x and y are integers, with y indexing the rows (i.e. scanlines) of the image and x indicating the offset of an image value along a scanline (i.e. the displayable pixel location on the scanline).

The method 200 starts when the input image data 201 is supplied to an edge extraction and quantisation process 203, a downsampling process 214 and an adder 221. The edge extraction and quantisation process 203 includes an extract and map excess values process 202. The extract and map excess values process 202 outputs mapped excess value data 204 and a copy of the input image data with excess values subtracted (input less excess values image) 206. This input less excess values image 206 is the second component or intermediate image, resulting from decomposition of the input image 201 into an excess values image and an intermediate image as described below with reference to FIG. 6.

The input less excess values image 206 is provided as input to an extract edge runs and map pixel differences process 208. The overall purpose of process 208, as is described in detail below, is to link edges (pixel edge segments) into edge runs, to assess which edge runs should be kept (qualified edge runs), and which edge runs should be discarded (disqualified edge runs). The extract edge runs and map pixel differences process 208 generates mapped pixel differences 210. These pixel differences are non-zero only along the subset consisting of qualified edge runs. The mapped pixel differences 210 consist of pixel difference values for horizontally nearest neighbour pixels and for vertically nearest neighbour pixels of an image tile. That is, the mapped pixel differences 210 consist of pixel difference values for pixel edge segments which are interior to an image tile. The mapped excess values 204 and mapped pixel differences 210 may be collectively referred to as image gradient data 205 of the input image 201.

An input less mapped excess values image 212 is formed by subtracting 207 the mapped excess value data 204 from the input image 201, and a low resolution image 216 is formed by downsampling 214 the input less mapped excess values image 212. The downsampling factor is preferably 8 in both image dimensions. Each downsampled image value is calculated as the average of a corresponding block of 8×8 input image pixels and is quantised. That is, the downsampling process 214 matches the calculation of DC values in an 8×8 forward DCT (Discrete Cosine Transform). As illustrated, the input less mapped excess values image is provided to the adder 221.

Edge Based Image Generation

Figure 24:
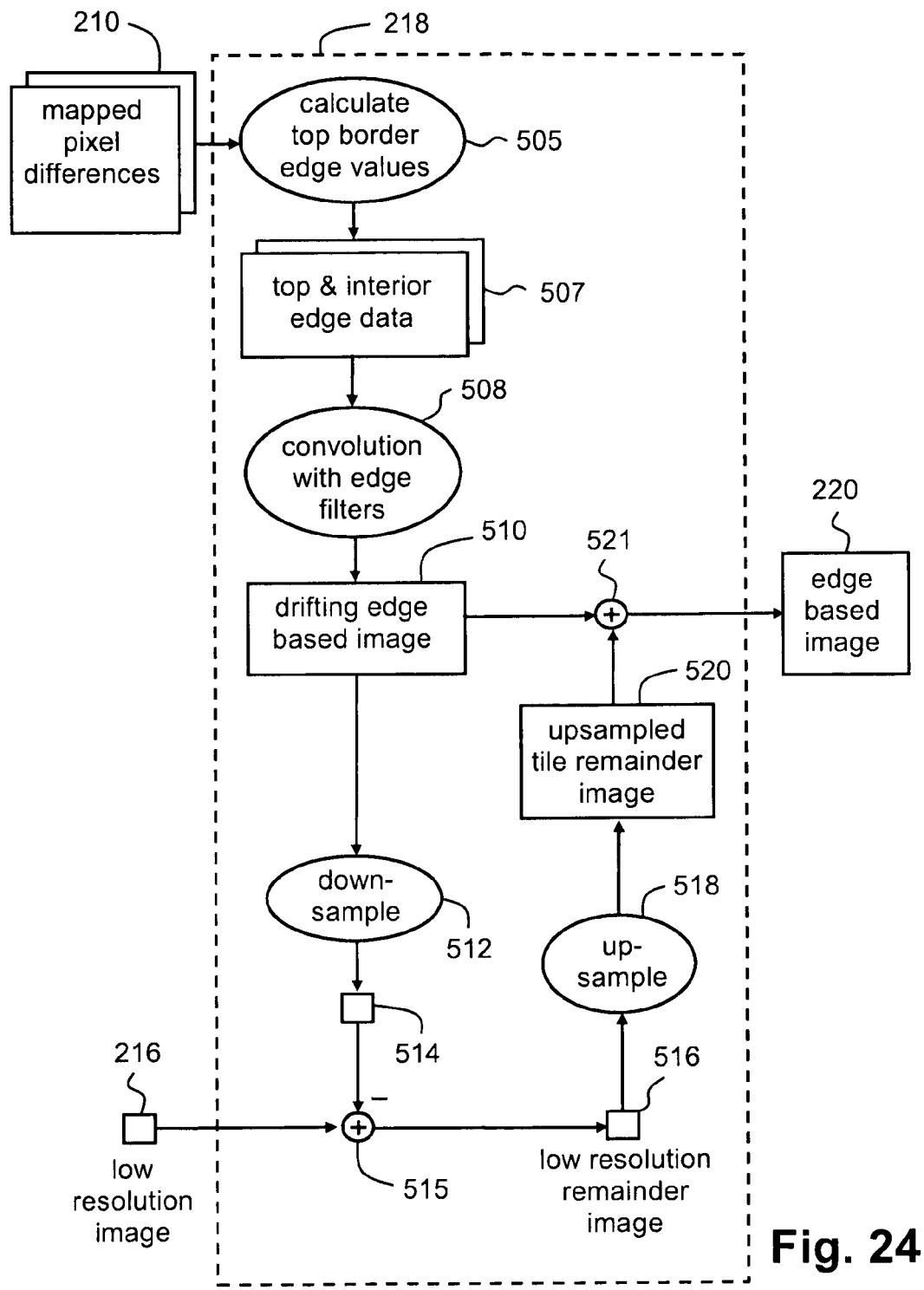
FIG. 24 is a data flow diagram of a generate edge based image process of FIGS. 2 and 3.

The image gradient data 205, and particularly the mapped pixel differences 210, together with the (quantised) low resolution image 216, are supplied to a generate edge based image process 218. Process 218 performs scanline processing to integrate horizontal and vertical pixel differences into an edge based image 220. FIG. 24 shows a data flow diagram of the generate edge based image process 218. As seen in FIG. 24, the scanline integration of pixel differences generates a 'drifting' edge based image 510 which has pixel differences similar to the mapped pixel differences 210 supplied as input to the process 218, but which has image values which can drift in the sense that the image values may show gradual trends not present in the image from which pixel differences were calculated. The quantised low resolution image 216 provides target average image values which firstly provide 'integration constants' for the recovery of image values from image pixel differences and secondly constrain drifting.

Calculation of Top Border Edge Values

Still referring to FIG. 24, the process 218 starts with a calculate top border edge values process 505, which accepts the mapped pixel differences 210 as input, and calculates values for edges at top border positions of the tile. The output from the calculate top border edge values process 505 is top and interior edge data 507 which consists of calculated top border edge values and interior edge values equal to mapped pixel differences 210.

Figure 25A:
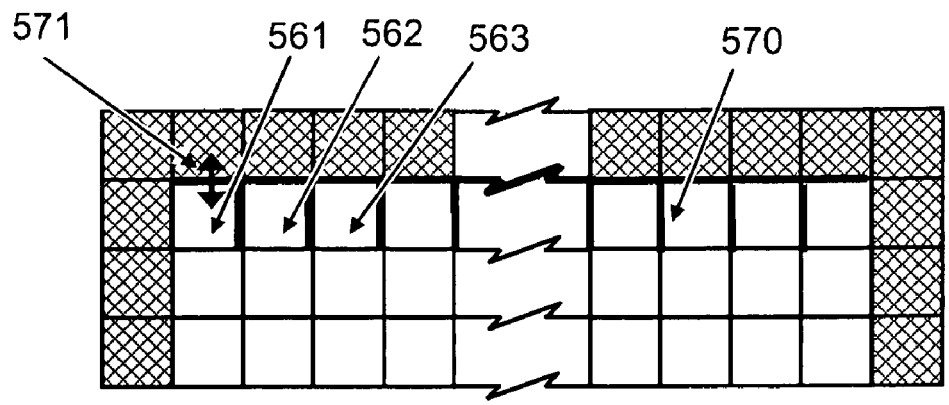
FIGS. 25A and 25B illustrate a sub-process of the generate edge based image process of FIG. 24.
Figure 25B:
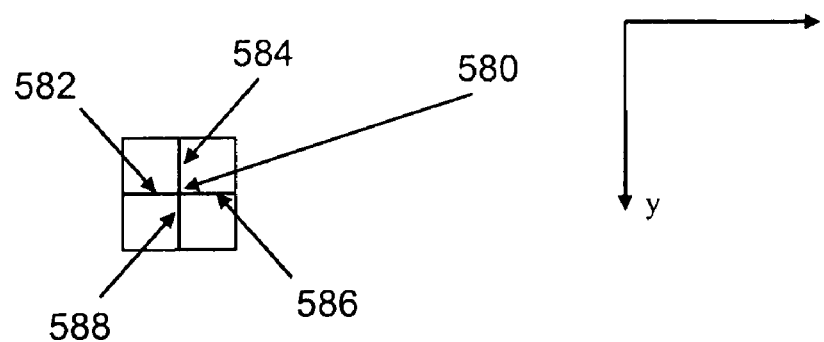

The calculation of top border edge values performed by process 505 is explained with reference to FIGS. 25A and 25B. FIG. 25A depicts an array of pixels, including pixels of the top 3 scanlines of an image tile and an additional scanline of pixels immediately above the tile. Pixels inside the tile are shown with a blank fill; pixels outside but adjacent to the tile are shown shaded. Pixel scanlines are drawn with zig-zag joins to indicate that they may extend many pixels horizontally. The left-most three pixels in the top scanline of the tile are pixels 561, 562 and 563.

A 'tile top border edge' refers to the horizontal edge between a pixel on the top scanline of the tile and the vertically adjacent pixel above it outside the tile. Top border edges are drawn with a thick line. Edge values for top border edges are calculated using values for edges which are interior to the tile and normal to the top tile border. These interior edges are also drawn with a thick line in FIG. 25A. An example interior edge 570 normal to the top tile border is also shown. Values for all interior edges are equal to corresponding values in mapped pixel difference data 210.

For the calculation of top border edge values of a tile, pixels above and adjacent to the tile are given a notional image value equal to the image value of the top-left pixel of the tile. Consequently the top edge of the top-left pixel, marked with bi-directional arrows 571, has edge value zero. Also, each vertical edge between a pair of pixels above and adjacent to the tile has edge value zero.

At the ends of any edge there are 2 pixel corners. Each top border edge value is calculated by considering the values of 3 other edges meeting at one of the pixel corners of the edge. FIG. 25B shows 4 pixels around a pixel corner 580. Let the co-ordinates of the bottom right pixel of the 4 pixels be (x, y). The 4 pixel edges meeting at the pixel corner 580 are edges 582, 584, 586 and 588, and correspond respectively to the image differences, $$im[x-1, y]-im[x-1, y-1], \quad (1)$$

$$im[x, y-1]-im[x-1, y-1], \quad (2)$$

$$im[x, y]-im[x, y-1] \text{ and} \quad (3)$$

$$im[x, y]-im[x-1, y]. \quad (4)$$

Only 3 of these 4 image differences are independent, any one being given by the other 3. For example, the image difference corresponding to edge 586 is the sum of image differences for edges 582 and 588, minus the image difference for edge 584. i.e.:

$$im[x, y]-im[x, y-1]=(im[x, y]-im[x-1, y])+(im[x-1, y]-im[x-1, y-1])-(im[x, y-1]-im[x-1, y-1]) \quad (5)$$

In the calculate top border edge values process 505, each border edge value is calculated so as to make the 4 edge values meeting at a pixel corner consistent in the same way as the 4 image differences at a pixel corner are consistent.

Consider in FIG. 25A the pixel corner on the tile border between the top-left pixel 561 and the next pixel 562 to the right along the tile border. Three of the four edges meeting at this pixel corner are already set—the top edge of pixel 561 (edge value set to zero), the interior edge between pixels 561 and 562 (edge value equal to the corresponding value in mapped pixel differences 210) and the edge between the outside pixels above pixels 561 and 562 (edge value also set to zero). The fourth edge at the corner, the border edge above pixel 562, is calculated so that the edge values are consistent in the same way that image differences are consistent at a pixel corner 580.

Now that the value of the border edge above pixel 562 is set, for the pixel corner on the tile border between pixels 562 and 563 there are three edge values set. So the 4th edge value around that pixel corner, for the border edge above pixel 563, can be calculated. Edge values for the top border edges are calculated in this way, one edge value at a time by proceeding to the right along the tile top border.

Calculating top border edge values by this processing ensures that top horizontal and vertical edges for the first scanline of the image tile are mutually consistent. It also avoids having to extract mapped pixel difference values for top border edges in the extract edge runs and map pixel differences process 208, and avoids having to code them, thereby reducing the compressed file size.

Drifting Edge Based Image Generation by Scanline Convolution with Edge Filters

Referring again to FIG. 24, a convolution with edge filters process 508 then generates a 'drifting' edge based image 510 from the top and interior edge data 507 for the corresponding input image tile 201. The convolution with edge filters process 508 is essentially an integration operation which generates image data from image gradient or difference data. The generated drifting edge based image 510 has the same resolution as the image difference data and has edges which mimic the position and signed magnitude of edges represented by that image difference data, while at other image positions it has image value changes which are comparatively small. If the input to the convolution with edge filters process 508 is a complete copy of the difference data of an image, then the output from the process 508 is a reconstructed copy of that image which only differs from that image due to the finite precision of the computation. However, due to the edge run extraction and mapping process 208, the pixel difference data 210 is a reduced or approximate copy of the difference data of the input image for which there is no requirement that local sums of horizontal difference values and local sums of vertical difference values match local sums of horizontal and vertical pixel differences in the input image 201. As a consequence the output 510 of the convolution with edge filters process 508 is an image with values which can gradually drift from desired image values. Hence the output of the convolution with edge filters process 508 is described as a 'drifting' edge based image 510.

Scanlines of the drifting edge based image 510 are generated, one scanline at a time, from the horizontal and vertical edge values of top and interior edge data 507.

The processing per scanline is described by the following equation dealing with convolution of sequences:

$$^{(y)}d\_edge\_im[x] = (^{(y)}im_x * v_0)[x] + ((^{(y)}im_y + ^{(y-1)}d\_edge\_im) * h_0)[x] \quad (6)$$

where:
$^{(y)}d\_edge\_im$ is the sequence of tile drifting edge based image values for a scanline y;
$^{(y)}im_x$ is the sequence of tile vertical edge values $im_x[x, y]$ for a scanline y;
$^{(y)}im_y$ is the sequence of tile horizontal edge values $im_y[x, y]$ for a scanline y;
[x] denotes the index of a sequence, so that $^{(y)image}[x]$ denotes image[x, y];
$im_y[x, y]$ is the horizontal edge value corresponding to the vertical pixel difference $im[x, y]-im[x, y-1]$ with $im_y[x, 0]$ being the top border edge value above a top-most pixel of the tile at position (x, 0)
$im_x[x, y]$ is the vertical edge value corresponding to horizontal pixel difference $im[x, y]-im[x-1, y]$
$h_0$ is a short sequence of horizontal edge filter values;
$v_0$ is a corresponding short sequence of vertical edge filter values; and
'*' denotes the 1D (one dimensional) convolution operation defined as generating an output sequence (f*g) from input sequences f, g such that:

$$(f*g)[x] = \Sigma_s (f[x-s] \cdot g[s]).$$

Horizontal and Vertical Edge Filters for Generation of the Drifting Edge Based Image The horizontal and vertical edge filter values for the generation of the drifting edge based image 510 by the scanline convolution with edge filters process 508 are chosen to satisfy the following equation $$v_0[x] - v_0[x-1] + h_0[x] = \delta[x] \quad (7)$$

where
δ is the 1D unit impulse function (or discrete delta function), satisfying $\delta[x]=1$ for x=0 and $\delta[x]=0$ for other integer values of x.

Equation 7 states that the difference of the vertical edge filter plus the horizontal edge filter equals the 1D unit impulse function.

Suitable horizontal edge filter values are given by the following equation:

$$h_0[x] = \frac{\tan^{-1}(2x+1) - \tan^{-1}(2x-1)}{\tan^{-1}(2w_{half}+1) - \tan^{-1}(2w_{half}-1)} \quad (8)$$

for $x = -w_{half}, \ldots, w_{half}$ where:
$w_{half}$ is a filter 'half-width' and
$h_0[x]=0$ for $|x|>w_{half}$.

The corresponding vertical edge filter values are calculated from the horizontal edge filter values of Equation 8 so that the horizontal and vertical edge filter values together satisfy Equation 7. This gives the following set of equations defining the vertical edge filter values:

$$v_0[x] = \begin{cases} \frac{1-h_0[0]}{2} & \text{for } x = 0 \\ v_0[x-1] - h_0[x] & \text{for } 0 < x < w_{half} \\ -v_0[-x-1] & \text{for } -w_{half} \le x < 0 \end{cases} \quad (9)$$

The horizontal edge filter values are all positive and diminish in magnitude with the absolute value of the filter index, x; further, they are symmetric about x=0, so a graph of the horizontal edge filter values is bell-shaped. The horizontal filter values are so chosen so that the contributions of a horizontal edge value to drift edge image values of the next scanline are well spread or "radially balanced". Vertical edge filter values with non-negative index, x are positive and vertical edge filter values with negative index are negative; they are anti-symmetric about x=−½ and diminish in magnitude as x moves away from x=−½.

When the pixel difference data of an input image is exact, the output of the scanline computation process described by Equation 6 using edge filters satisfying Equation 7 is a perfect reconstruction of the input image. In generation of a drifting edge based image by the convolution with edge filters process 508, top border edge values are used which are calculated using a notional value for pixels immediately above the tile equal to the image value of the top-left pixel of the tile. This has the result of adding the same offset to all image values of a tile drifting edge image. Consequently, when the pixel difference data 210 exactly matches the internal pixel difference data of a tile, the generated drifting edge based image 510 is an exact reconstruction apart from a common image value offset. The addition of this offset is counteracted as a result of the drift correction processing using the low resolution image data 216.

However, typically the pixel difference data is a reduced representation of the tile interior pixel differences and the reconstruction is only approximate. The value of $w_{half}$ affects the accuracy of the reproduction when the pixel difference data is reduced. For the extreme choice of $w_{half}=0$ the horizontal edge filter has a single central non-zero value of 1 and the vertical edge filter has all values equal to zero. This degenerate case corresponds to calculating drifting edge image values simply by summing horizontal edge values down columns as a 1D integration. In this case, errors in the drifting edge based image are propagated undiminished down columns leading to the appearance of vertical streaks in the drifting edge based image. A feature of the described arrangements is that image reconstruction error due to an inexact gradient value is spread. Consequently, the present arrangement is concerned with choices of $w_{half}$ greater than 0, for which errors in the drifting edge based image are spread horizontally and diminish from scanline to scanline. With larger values of $w_{half}$, errors in the drifting edge based image are spread more widely and are less visible. On the other hand, larger values of $w_{half}$ mean more computation. Suitable quality without excessive computation is achieved by using $w_{half}=3$.

Rewriting Equation 6 for these edge filters, the calculation by scanline convolution of a tile drifting edge image value of scanline y and with offset along the scanline, x is given by $$^{(y)}d\_edge\_im[x] = \qquad (10)$$
$$\sum_{i=-w_{half}}^{i=w_{half}} (^{(y-1)}d\_edge\_im[x-i] + {}^{(y)}im_y[x-i]) \cdot h_0[i] +$$
$$\sum_{i=-w_{half}}^{i=w_{half}-1} {}^{(y)}im_x[x-i] \cdot v_0[i]$$

Figure 26A:
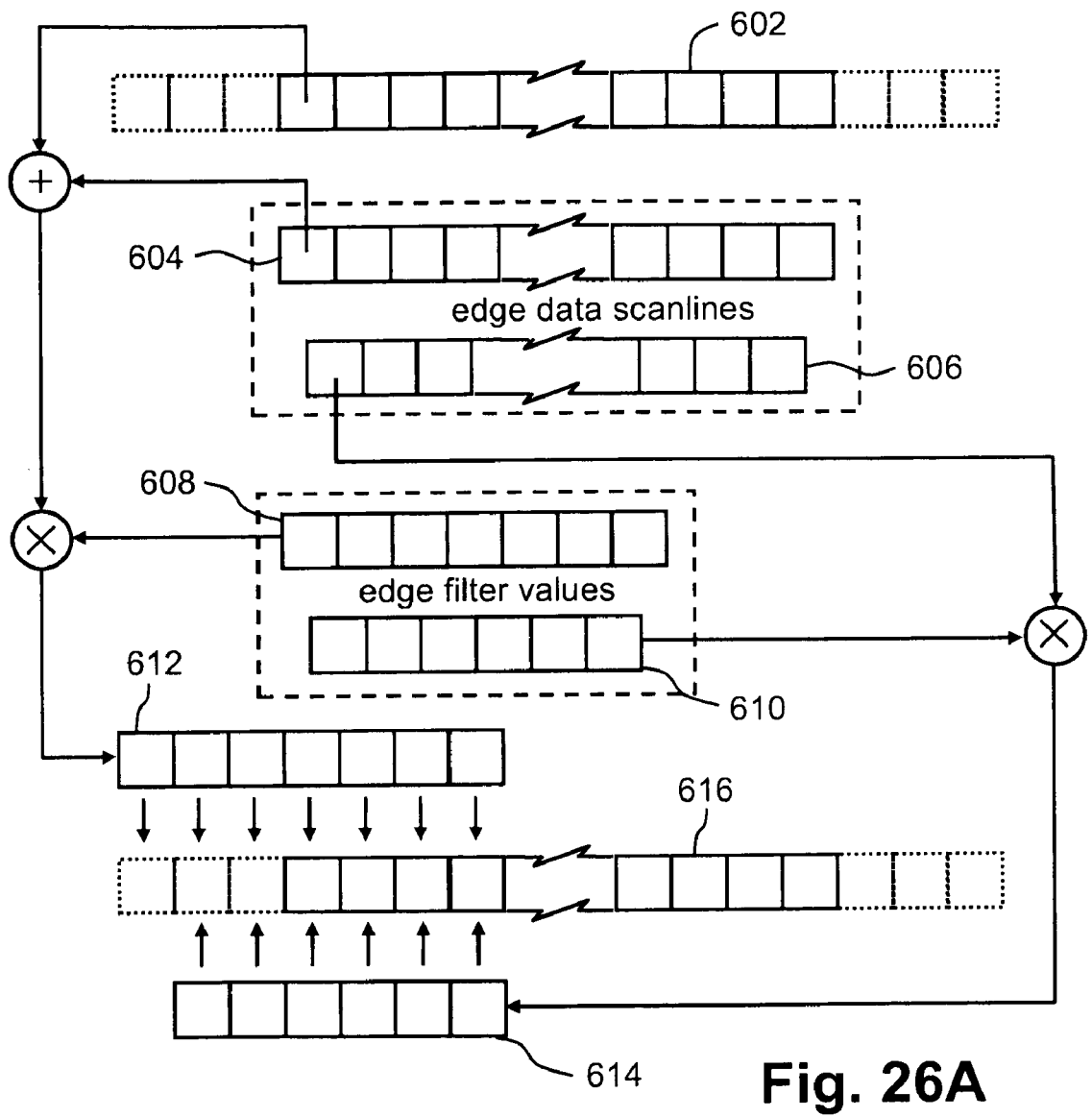
FIGS. 26A and 26B illustrate the calculation of a scanline of a drifting edge based image as performed in the generate edge based image process of FIG. 24.

FIG. 26A depicts the calculation of scanline y of the tile drifting edge based image according to Equation (6). A buffer of pixel values for scanline y of the tile drifting edge based image, $^{(y)}d\_edge\_im$ indicated by the row of squares, 616 is calculated using a buffer of pixel values of the previous scanline, scanline (y−1) of the tile drifting edge based image, $^{(y-1)}d\_edge\_im$ indicated by the row of squares, 602. For calculation of the first scanline, at y=0, of the tile drifting edge based image, a notional previous scanline of the tile drifting edge based image is used with all values set equal to zero.

Other inputs to the calculation of scanline y of the tile drifting edge based image are scanline y of the tile horizontal edge data, $^{(y)}im_y$ indicated by the row of squares, 604 and scanline y of the tile vertical edge data, $^{(y)}im_x$ indicated by the row of squares, 606 together with horizontal edge filter values, $h_0$ indicated by the row of squares, 608 and vertical edge filter values, $v_0$ indicated by the row of squares, 610.

Returning to FIG. 26A, the calculation of image values for scanline y of the tile drifting edge based image, stored in scanline buffer, 616, using image values for scanline y−1 of the tile drifting edge based image, stored in scanline buffer, 602, is now described in more detail.

Supposing the image tile is X pixels wide, each of the scanline buffers for the tile drifting edge based image, 602 and 616 has length (X+2. $w_{half}$) with X central memory locations depicted with solid squares and $w_{half}$ extra memory locations at each end of the buffer depicted as dotted squares. This padding at the ends of the tile drifting edge based image scanline buffers is to allow filtered values to be added to the buffer without overwriting neighbouring memory locations. Only the central X values of the tile drifting edge based image buffer, 602 for scanline (y−1) are used in calculating values of the drifting edge based image for scanline y.

There are X horizontal edge based image values per scanline, corresponding to edges above each pixel of the scanline and X−1 internal vertical edge based image values per scanline, corresponding to edges between pairs of pixels of the scanline.

Calculation of scanline y of the tile drifting edge based image, stored in scanline buffer, 616 from scanline y−1 of the drifting edge based image, stored in scanline buffer, 602 is made up of the following steps.

Step 1. All values of the scanline buffer, 616 are set to zero.

Step 2. For each column position, x of the X horizontal edge positions, where $0 \leq x \leq X-1$, add the value at the x'th central position in scanline buffer, 602, being the x'th image value for scanline y−1 of the tile drifting edge based image and the value at position x of buffer 604, being the x'th horizontal edge value for scanline y and multiply the result with each of the horizontal filter values, stored in buffer, 608 to generate horizontal edge filtered values $$(^{(y-1)}d\_edge\_im[x] + {}^{(y)}im_y[x]) \cdot h_{0[i]} \text{ for } -w_{half} \leq i \leq w_{half}$$

Add these horizontal edge filtered values to values in positions $x-w_{half}$ through $x+w_{half}$ of the buffer, 616 for scanline y of the tile drifting edge based image. FIG. 26A shows this processing for the first of the X column positions.

Step 3. For each column position, x of the X−1 internal vertical edge positions, where $1 \leq x \leq X-1$, multiply the value at position x of buffer 606, being the x'th vertical edge value for scanline y with each of the vertical edge filter values, stored in buffer 610 to generate vertical edge filtered values $$^{(y)}im_x[x] \cdot v_0[i] \text{ for } -w_{half} \leq i \leq w_{half}-1$$

Add these vertical edge filtered values to values in positions $x-w_{half}$ through $x+w_{half}-1$ of the buffer, 616 for scanline y of the drifting edge based image.

FIG. 26A shows this processing for the first of the X−1 internal vertical edge positions.

Step 4. For each of the $w_{half}$ extra memory locations, at each end of the buffer 616, the value at the extra memory location is added to the value in that central position of the buffer which is the same distance from the image border as the extra memory location.

Figure 26B:
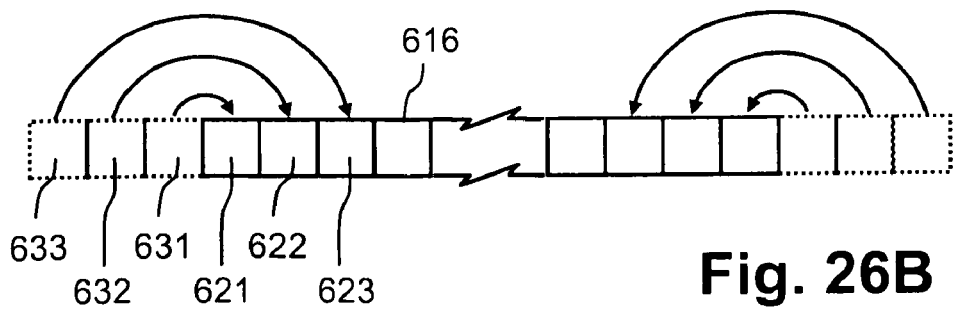

FIG. 26B depicts this processing. At the extra memory locations at the left end of the buffer, 616, values at extra memory locations, 631, 632 and 633 are added to values at central memory locations, 621, 622 and 623 respectively. Similar processing is performed for the right end of the buffer 616.

With this special processing at the left and right ends of the scanline buffer, drifting edge based image values are obtained which are equivalent to those which would be obtained by processing a larger image tile consisting of horizontally adjoining copies of the tile of top and interior edge data where alternate tile copies are flipped horizontally. This special border processing avoids having sequences which grow in width with repeated scanline convolution. It also avoids the need to use left and right border edge values for the image tile and the need to extract and code corresponding pixel differences thereby reducing the compressed file size and supporting efficiency for scanline by scanline processing in a single pass.

The generated drifting edge based image 510 has the same resolution as the top and interior edge data 507, and has pixel differences which largely mimic the top and interior edge data 507.

In this description, the contribution of a single positive unit magnitude image gradient value to edge based image values is called an 'edge field'. Generation of the drifting edge based image can be described as essentially the sum of, first, the 2D (two dimensional) convolution of horizontal edge data with the horizontal edge field, and second, the 2D convolution of vertical edge data with the vertical edge field.

The scanline drifting edge based image generation process described above implements a particular method of convolution of edges with particular edge fields. Other methods of convolving edges with other edge fields may be desirable for various image compression/decompression applications.

For generation of an edge based image by scanline convolution of pixel difference data with edge fields, errors due to a reduction in pixel difference data can be spread twice as much, and be made to approximate an optimal uniform radial spread, by performing scanline convolution in two passes. A downward pass and an upward pass are performed and the image value results obtained by the two passes are averaged. Prior to performing the upward pass, a set of consistent border edge values should be calculated for the bottom of the tile, similarly to the calculation of a set of consistent top border edge values prior to the downward pass described above using FIGS. 25A and 25B. The greater error spreading by performing downwards and upwards passes provides increased reduction in error with distance from an error impulse.

Scanline convolution processing can only approximate a radial spread and the approximation degrades with repeated self-convolution. An exact uniform radial spread can be implemented by direct 2D convolution of horizontal and vertical edge data with full-plane radial edge fields. For scanline convolution of pixel difference data of an image tile with edge fields, the amount of processing is O(n), where n is the number of pixels in the tile, whereas for 2D convolution of horizontal and vertical edge data with edge fields the amount of processing is $O(n^2)$. So, for larger image tiles, 2D convolution involves considerably more computation than the scanline convolution described above. However, the 2D convolution processing can be implemented using Fourier transforms and multiplication in the frequency domain to reduce the increase in processing.

For satisfactory image quality of decompressed images, there should not be visible discontinuities at tile boundaries which were not present in the input image. Further, to achieve good quality decompressed images with low compressed image size, it is important that decompressed image tiles join seamlessly with only limited residual image data. As described above, a tile edge based image is calculated using only image gradient data for the tile. As a consequence, a complete edge based image obtained by juxtaposing tile edge images typically shows image value discrepancies along tile borders. This is not necessarily of concern because those discrepancies are corrected by tile residual data, and moreover those discrepancies are substantially corrected by low frequency tile residual data. However, higher image compression ratios can be achieved, at the expense of more processing, to improve tile joins.

An alternative achieves higher image compression by generating tile edge based images which join together much more accurately. In this implementation improved tile edge based image values near tile borders are obtained by computing each tile edge based image from image gradient data and low resolution image data which extends beyond the tile. The method of image compression and decompression of the alternative is as described above except that a modified process is used to generate a tile edge based image.

The alternative also differs in how additional low resolution remainder image values are obtained to use for upsampling. In the first arrangement, additional low resolution remainder image values are obtained by reflecting tile low resolution remainder image values. In the alternative, additional low resolution remainder image values are obtained by processing an extended tile of gradient data and low resolution image data. A combination of these methods can also be used in which firstly some additional low resolution remainder image values are obtained by processing a partly extended tile of gradient data and low resolution image data and secondly by reflecting image values of the partly extended tile of low resolution image values.

Generation of Drift Corrected Edge Based Image by Downsampling and Upsampling

Returning to FIG. 24, processing for drift correction of drifting edge based image 510 is now described. A downsampling sub-process 512 downsamples the tile drifting edge based image 510 to form a downsampled drifting edge based image 514. The downsampling factor is the same as in process 214, being preferably 8 in both image dimensions, and each downsampled image value is the average of a corresponding block of 8×8 tile drifting edge based image pixels. That downsampled tile drifting edge based image 514 is then subtracted 515 from the low resolution image 216 previously formed by downsampling process 214 to form a tile low resolution remainder image 516.

An upsampling process 518 generates an upsampled tile remainder image 520 from the tile low resolution remainder image 516. The upsampling factor is the same as the downsampling factor used in sub-process 512, being preferably 8 in both dimensions. In the upsampling operation, additional low resolution image samples outside the tile low resolution remainder image 516 are used which are obtained by reflecting low resolution image values about the borders of the tile low resolution remainder image 516. The upsampled tile remainder image 520 is then added 521 to the drifting edge based image 510 to generate the edge based image 220 for the tile of input image data 201.

Residual Image Processing and Coding of Compressed Image Representation

Returning to FIG. 2, a residual image 222 is obtained by subtracting, in the adder 221, the edge based image 220 from the input less mapped excess values image 212. The residual image 222 is in turn input to a forward Discrete Cosine Transform (DCT) process 224 generating quantised DC DCT coefficients 226 and quantised AC DCT coefficients 228. The quantised DC transform coefficients, shown as the dotted square 226 in FIG. 2, need not be generated and coded because in decompression the quantised DC transform coefficients 226 can effectively be reconstructed from the quantised low resolution image values 216 and a downsampling of edge based image values 220.

The data items 204, 210 (i.e. 205), 216 and 228, enclosed in the dashed rectangle, constitute the representation 250 of the input image 201 used for coding. An encoding process 230 encodes this representation 250 and generates coded data 232. The coded data 232 includes different components for each of the components of the representation 250 and different coding methods are desirably used for each type of data in the image representation 250. As seen, the image gradient data 205 is encoded into a corresponding portion 233. Coding and decoding of mapped excess values is described below with reference to FIGS. 14 and 15, whereas coding and decoding of mapped pixel differences 210 represented as edge runs is described below with reference to FIGS. 22 and 23. The quantised low resolution image data 216 is losslessly coded and decoded according to the JPEG Huffman coding of DC coefficient difference values. The quantised AC DCT coefficients 228 are losslessly coded and decoded according the JPEG Huffman coding of AC coefficients. JPEG Huffman entropy coding is described in chapter 11 of "JPEG Still Image Compression Standard" by W. B. Pennebaker and J. L. Mitchell, with that reference being incorporated herein by reference. Such encoding and decoding is typically performed in a blockwise fashion (block-by-block).

Variations of Compression with Data Loss

Three variants of the compression method 200 are now described. These variants may be practised separately or together.

1. The mapping performed in the extract and map excess values process 202 is an identity mapping that does not alter the excess values image (in effect, a map excess values process 804 described below as part of the extract and map excess values process 202 is skipped). In this variant, the downsampling process 214 is performed on the input less excess values image 206, and the mapped excess values image in the image representation 250 is the same as the excess values image.

2. The intermediate image is obtained by processing the input image so as to increase the preponderance of long contours extracted by the process 208. The excess values image on which the map excess values process 804 is applied is set to be the input image less the intermediate image. In the first embodiment and variant 1 thereof, the intermediate image is a copy of the input image from which excess values have been subtracted. However other kinds of processing to produce a different intermediate image are used in variant 2, for example 'salt and pepper' noise removal via median filtering as is well known in the image processing art.

3. In this variant there is no excess values image. Instead, a process 208' extracts vertical gradient data and horizontal gradient data from the tile image data 201, and the downsampling 214 is also performed on the tile image data 201. The vertical gradient (i.e. horizontal edge) values $im_y[x, y]$ are derived from vertically neighbouring input image pixel differences $im[x, y]-im[x, y-1]$, while the horizontal gradient (i.e. vertical edge) values $im_x[x, y]$, are derived from horizontally neighbouring input image pixel differences, $im[x, y]-im[x-1, y]$. The extracted gradient data is a reduced or approximate representation as it includes horizontal and vertical gradient values for visually significant edges typically recorded with reduced precision and it excludes gradient values of edges which are visually insignificant such as short edges or noisy low amplitude edges.

Decompression where there is Data Loss for Excess Values or Pixel Differences

Figure 3:
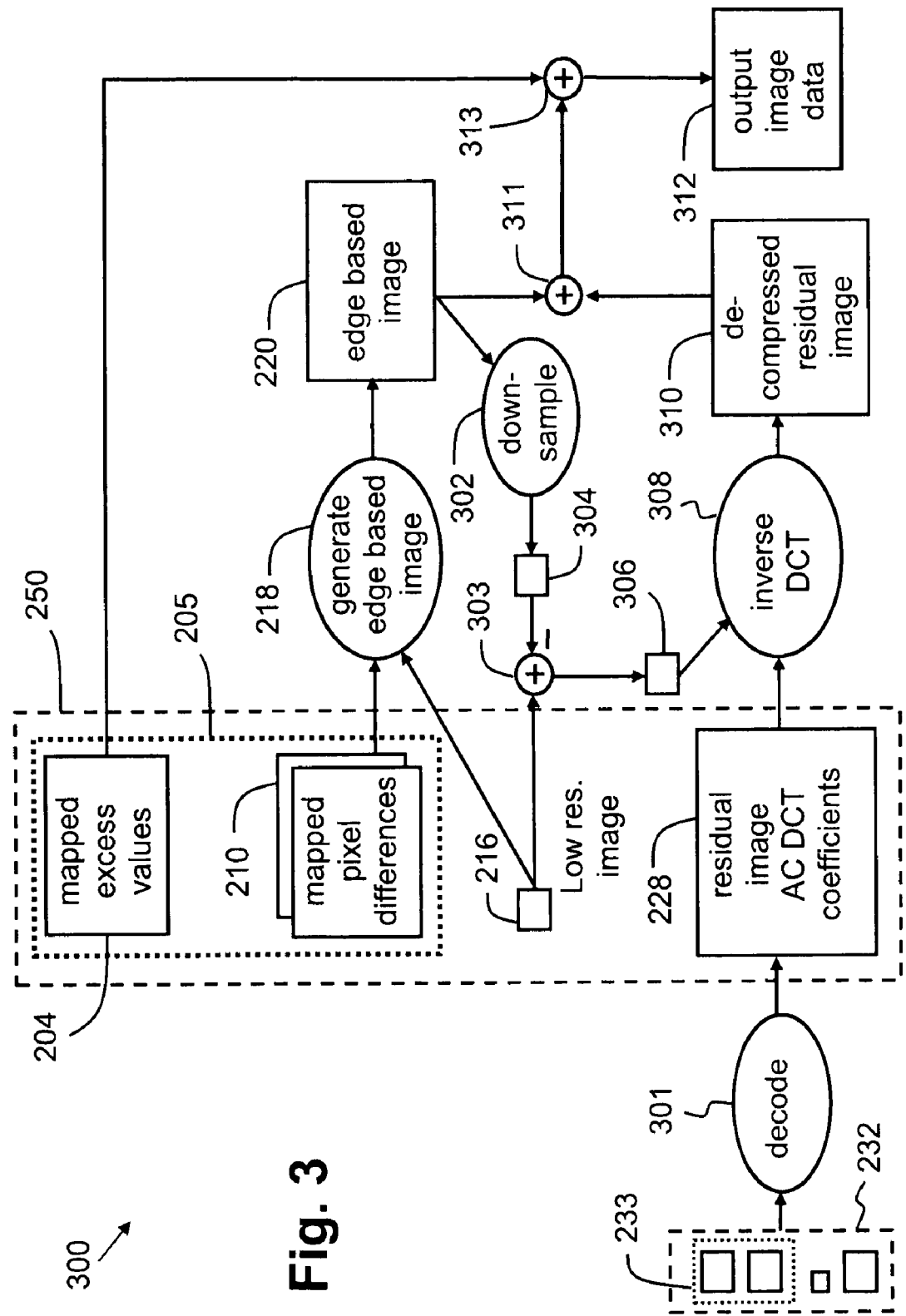
FIG. 3 is a data flow diagram of a method of image decompression which is complementary to the image compression method of FIG. 2.

FIG. 3 shows a data flow diagram of a method 300 of decompressing coded image data 232 where there is data loss in representing excess values by mapped excess values or in representing pixel differences of the input less excess values image by mapped pixel differences or in discarding edge runs. Coded image data 232 is decoded by process 301 generating image representation data 250, made up of mapped excess values 204, mapped pixel differences 210, both collectively forming the image gradient data 205, quantised low resolution image 216 and quantised AC DCT coefficients 228.

An approximate image, in this case an edge based image 220, is generated from the mapped pixel differences 210 and quantised low resolution image data 216 according to the same edge based image generation process 218 as used in the compression method 200 of FIG. 2. The edge based image 220 is then downsampled by process 302 using the same downsampling method as process 214 (FIG. 2), generating downsampled edge based image data 304. This downsampled edge based image data 304 is subtracted 309 from the low resolution image data 216 to generated downsampled residual image 306 (which generates quantised DC DCT coefficients similar to the quantised DC DCT coefficients 226 of the residual image 222 of FIG. 2). The downsampled residual image 306 and quantised AC DCT coefficients 228 are supplied to an inverse DCT process 308 to generate a de-compressed residual image 310. The decompressed residual image 310 is a lossy version of the residual image 222 of FIG. 2 where the amount of data loss is determined by quantisation of the residual image AC DCT coefficients 228 and the quantisation of the low resolution image data 216. Finally, the decompressed residual image 310, the edge based image 220 and the mapped excess values 204 are added using adders 311 and 313 to generate output image data 312.

Lossless Coding of Some Blocks within a Tile Coded with Data Loss

As explained previously, a tile preferably consists of a whole number of 8×8 blocks of image pixels. While there may be data loss for a tile as a whole in representing excess values by mapped excess values or in representing pixel differences by mapped pixel differences or in discarding edge runs, it may be the case for some blocks that excess values and pixel differences internal to the block are represented losslessly. When the excess values of a block and the internal pixel differences of a block are represented losslessly, this data, together with a low resolution image value for the block, is sufficient to recover the original image data for the block and there is no need to code residual data for the block.

Where excess values and internal pixel differences are represented losslessly for some but not all blocks within a tile, the compression is as described above and shown in FIG. 2, but with the additional coding of a flag for each block indicating whether it is coded losslessly or not; for blocks coded losslessly no AC DCT residual data is coded. Decompression proceeds similarly as described above with respect to FIG. 3, but with the following exceptions. Firstly, the decompressed residual image 310 is calculated using zero valued AC DCT coefficients for the lossless blocks. Secondly, after calculation of the edge based image tile 220, image values for each lossless block of the edge based image tile are overwritten with summed image values for the block. The summed image values for a block are calculated from a low resolution image value for the block and the mapped internal pixel differences for the block similarly to a generate summed image process 502 described below.

Compression and Decompression where there is No Data Loss for Pixel Differences or for Excess Values In FIG. 4 a data flow diagram of a method 400 of compressing input image data 201 is shown for the case where there is no data loss in representing pixel differences of the input less excess values image by mapped pixel differences and there is no data loss in representing excess values by mapped excess values. In this case there is no need to calculate and code a residual image. Image compression proceeds initially as for the case (method 200 described with reference to FIG. 2) where there is data loss for mapped pixel differences or for mapped excess values, with mapped excess values 204 and mapped pixel differences 210 being prepared as a representation of the gradients of the input image 201. These data items 204 and 210 together with one image value of the input less excess values image 206, preferably top-left image value 401, provide a complete and exact representation of the input image data 201, and are shown enclosed in dashed rectangle 402. An encoding process 404 encodes this representation 402, generating coded image data 406. Coding and decoding of mapped excess values and mapped pixel differences are described below with reference to FIGS. 14, 15, 22 and 23.

In FIG. 5 a data flow diagram of a method 500 of decompressing the coded image data 406 is shown for the case where there is no data loss in representing excess values by mapped pixel differences and there is no data loss in representing pixel differences of the input less excess values image by mapped pixel differences. Coded image data 406 is decoded by process 501 generating image representation data 402, made up of mapped excess values 204, mapped pixel differences 210 and the image value of the (preferably) top-left pixel of the input less excess values image 401.

The mapped pixel differences 210 being the horizontal and vertical pixel differences of the input less excess values image 206 can be used together with a single reference image value, preferably top-left image value 401, to recover the input less excess values image 206 by a generate summed image process 502 which simply sums pixel differences. Not all mapped pixel differences are required by process 502 to generate the summed image. For example, it is sufficient to use only vertical pixel differences, to sum along image rows and the first pixel difference in each row of horizontal pixel differences to obtain the first summed image value of each row (except the top row) from the first summed image value of the previous row. The resulting approximate image, in this case referred to as summed data image 504, is the same as the input less excess values image 206 (FIG. 4).

Finally the mapped excess values 204 are added to the summed image data 504 to generate output image data 506, which is identical to the input image data 201 (FIG. 4).

Input Image Decomposition and Excess Value Mapping

Figure 6:
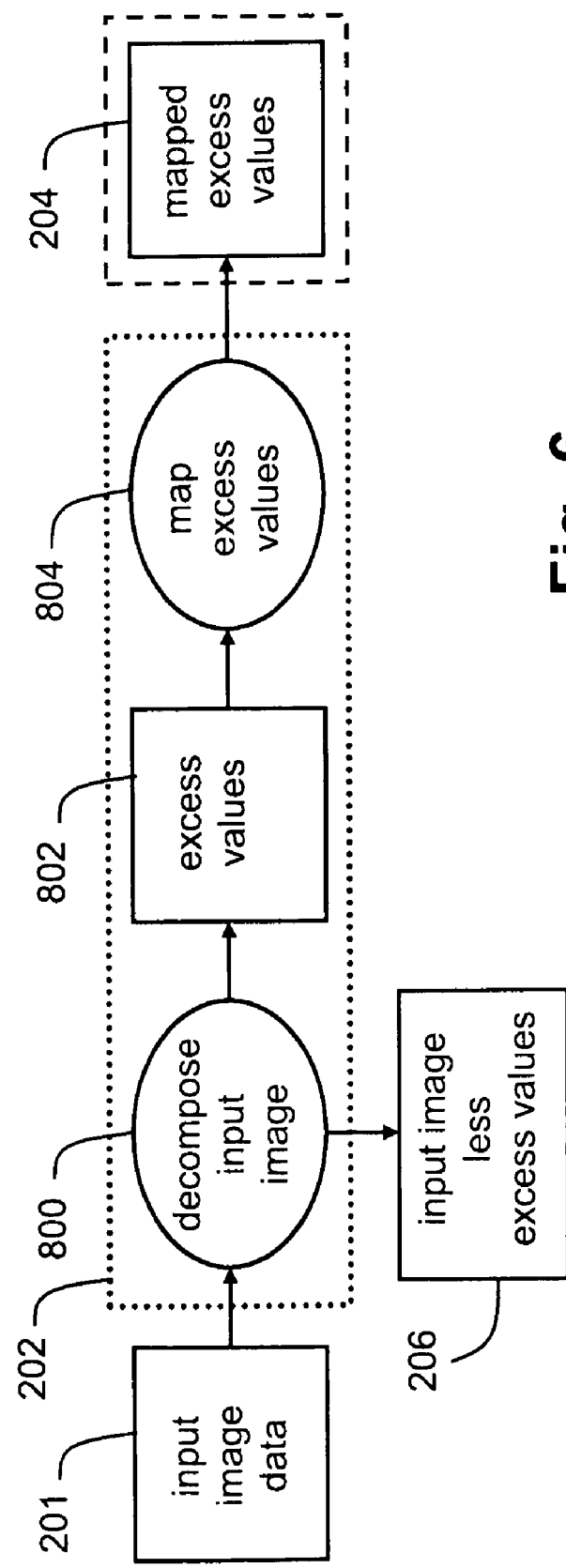
FIG. 6 is a data flow diagram of an extract and map excess values process of FIGS. 2 and 4.

FIG. 6 provides a breakdown of the excess value extraction and mapping process 202. Process 202 consists of two sub-processes: a decompose input image process 800 and a map excess values process 804.

The decompose input image process 800 performs the decomposition of the input image into two component images as discussed above and as described in detail below with reference to FIG. 7. The first component image is an excess values image 802 and the second component image is an input less excess values image 206. For any pixel position, the sum of image values in the 2 component images equals the image value for that pixel in the input image 201. The map excess values process 804 performs a mapping of excess values 802 to mapped excess values 204 as described below with reference to FIG. 9.

Figure 7:
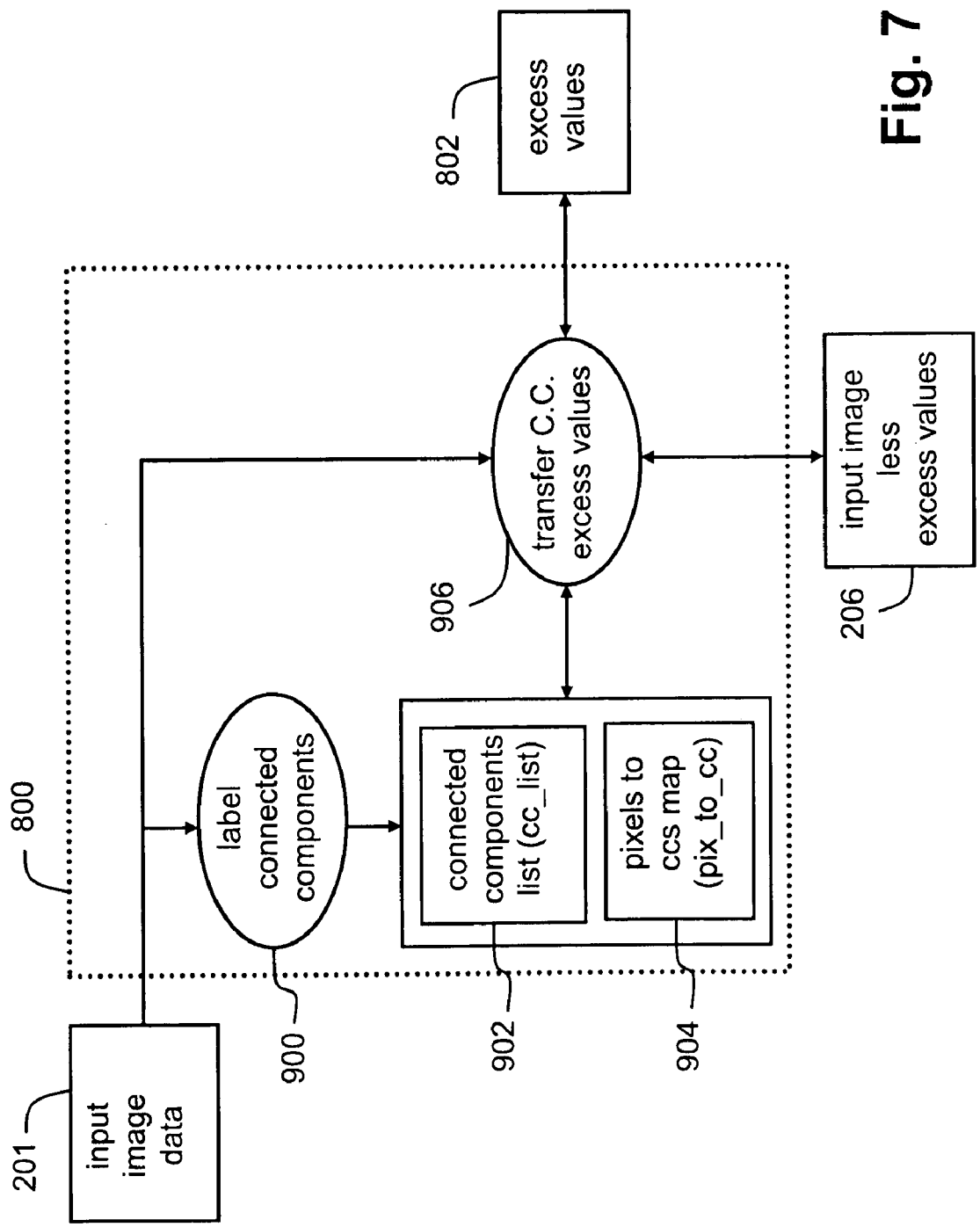
FIG. 7 is a data flow diagram of a decompose input image process of FIG. 6.

FIG. 7 shows a breakdown of the decompose input image process 800 (FIG. 6). Process 800 consists of two sub-processes: a label connected components process 900 and a transfer connected component excess values process 906.

Connected Component Labelling

A connected component is a set of pixels which share similar image values and are connected to each other. In the first embodiment, two image values are considered similar if they are the same and two pixels are considered connected if they are 4-way connected. That is, a connected component is a region of pixels which are 4-way connected having the same image value. The connected component ('C.C.') labelling process 900 generates and uses two data structures: a list of connected component data structures (cc_list) 902 and a mapping image (pix_to_cc) 904. The size of the mapping image (pix_to_cc) 904 is the same as the input image tile 201 and each value in the mapping image (pix_to_cc) is an index referencing a connected component in cc_list 902. Items in the connected component data structure include: (i) a parent index referencing its 'parent' connected component in the cc_list 902; (ii) the area of the connected component being the number of pixels in the connected component; and (iii) the position of the pixel of the connected component which is left-most on the top-most scanline of the connected component.

Connected component labelling is a well known image processing operation. In this case it is performed in a single pass in raster order through the pixels of the input image tile 201. The parent index item in the connected component data structure facilitates labelling of connected components. For example, with a single raster scan of pixels, a "U" shaped connected component can be encountered twice as a new connected component leading to the creation of 2 connected component data structures. When subsequently scanned pixels reveal that the 2 connected component data structures correspond to a single connected component, the parent index of one of the connected component data structures can be updated with the index of the other connected component data structure. A zero valued parent index indicates the connected component does not have a parent and is a root or top-level connected component.

On completion of connected component labelling, each value in pix_to_cc 904 is a non-zero index referencing a connected component in cc_list 902 and that connected component is either a top-level connected component or references, via its parent index, a top-level connected component; and each top-level connected component in cc_list 902 records the total number of pixels within the connected component and the left-most top pixel position for the connected component.

A transfer connected component excess values process 906 initialises the input image less excess values image 206 as a copy of the input image tile 201 (FIG. 1) and initialises the excess values image 802 as a zero-valued image of the same size as the input image tile 201. Subsequently the function of process 906 is to transfer excess values for small, extreme-valued connected components by subtracting such values from the input less excess values image 206 and by adding those values to the excess values image 802.

A connected component has an excess value if the image value of the connected component is extreme; that is, if the image value of the connected component is above the image value of all pixels neighbouring the connected component, or if the image value of the connected component is below the image value of all neighbouring pixels. Where a connected component has an extreme image value, the excess value for the connected component is the image value of the connected component less the least different image value of a neighbouring pixel. The excess value of a connected component is transferred by adding the excess value to the excess values image 802 and subtracting the excess value from the input less excess values image 206 for all pixels of the connected component. Once the excess value for a small extreme-valued connected component is transferred, the connected component has the same value in the input less excess values image 206 as at least one neighbouring connected component and it can be merged with neighbouring connected components of that value. If the resulting merged connected component is again small and extreme-valued it too has its excess value transferred.

To achieve this transfer of excess values, process 906 operates on the data structures cc_list 902 and pix_to_cc 904 and the input less excess values image 206 and the excess values image 802 by two passes through the connected components in cc_list 902. The first pass through the connected components in cc_list 902, examines connected components for positive excess values and is described below with reference to FIG. 8. The second pass is similar and examines connected components for negative excess values. Examining connected components in two passes ensures a more consistent treatment throughout the image when neighbouring connected components have opposite signed excess values.

Figure 8:
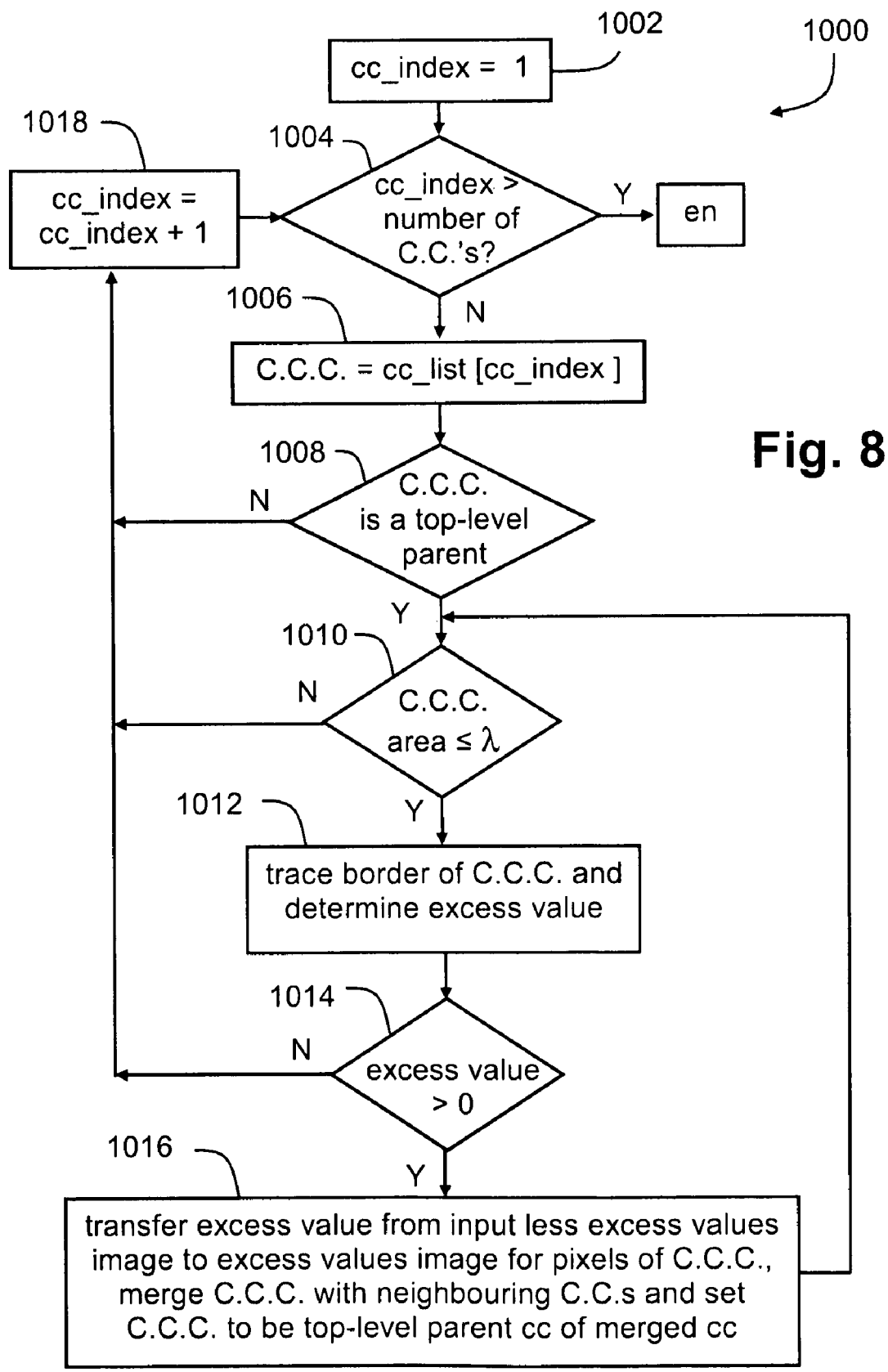
FIG. 8 is a schematic flow diagram of a transfer connected component excess values process of FIG. 7.

FIG. 8 shows a schematic flow diagram of the first pass 1000 through the connected components list 902 examining connected components for positive excess values. The first pass 1000 starts at step 1002 where an index, cc_index, is initialised to 1, with cc_index being an index into the list of connected components. Step 1004 then determines whether cc_index is greater than the number of connected components in cc_list 902. If it is determined that cc_index is in fact already greater than the number of connected components in cc_list 902, then the first pass 1000 ends. However, if it is determined that cc_index is not yet greater than the number of connected components in cc_list 902, then in step 1006, the current connected component (C.C.C.) is set to be the connected component in the cc_list 902 indexed by cc_index. In step 1008 it is then determined whether the current connected component is a top-level parent connected component by checking if its parent index is zero. If it is determined that current connected component is not a top-level parent cc, then examination of the current connected component is finished and processing proceeds to step 1018 where the cc_index is incremented before returning to step 1004, thereby continuing the pass through the list of connected components.

If it is determined in step 1008 that current connected component is a top-level parent cc, then examination of the current connected component continues to step 1010 where it is determined whether the area of the current connected component is less than, or equal to, the value of a connected component size parameter λ. If it is determined that the area of the current connected component is greater than the value of the connected component size parameter λ, then examination of the current connected component is finished and processing proceeds to step 1018. Alternatively, examination of the current connected component continues to step 1012 where pixel differences across pixel borders at the boundary of the current connected component are examined in sequence, tracing around the boundary of the current connected component, starting with an edge of its left-most top pixel. Where it is found that the image value of the current connected component is above the image value of all neighbouring pixels, the difference in image value between the image value of the connected component and the maximum image value of the neighbouring pixels is considered to be the excess value for the current connected component. While tracing the border of the current connected component, if a neighbouring pixel is found with image value above the image value of the current connected component the excess value is set to zero and step 1012 completes. Also while tracing the border of the current connected component, a bounding box for pixels of the current connected component is calculated.

Following completion of step 1012, step 1014 determines whether the resulting excess value for the current connected component is positive. If it is determined that the resulting excess value is not positive, then examination of the current connected component is finished and processing proceeds to step 1018.

However, if it is determined in step 1014 that the resulting excess value for the current connected component is positive then, in step 1016, the excess value for the current connected component is transferred to the excess values image 802 (FIG. 7). Processing for step 1016 commences by updating values of the pix_to_cc mapping image 904 for the current connected component to be the index of the current connected component. In this updating step, the pixels of the current connected component are determined (using the pix_to_cc mapping image 904) as those pixels within the bounding box calculated in step 1012 having their top-level parent connected component equal to the current connected component. Processing for step 1016 then continues as follows. For each pixel of the current connected component the current component excess value is subtracted from the input less excess values image 206 and is added to the excess values image 802. As a result, each pixel of the current connected component in the input less excess values image 206 has the same, new image value (the maximum value of the neighbouring pixels). Also, pixels neighbouring the current connected component are examined to see if those pixels have an image value equal to the current connected component new image value. Where a neighbouring pixel has such an image value (at least one must), the connected component for that pixel is merged with the current connected component. A pair of connected components is merged by: (i) determining which top-level parent of the two connected components has its left-most top pixel first in raster order (note that a top-level parent of a connected component may be the connected component itself); (ii) updating the area of that first top-level parent connected component by addition of the area of the other top-level parent connected component; and (iii) modifying the parent index of the other top-level parent connected component to be that of the first top-level parent connected component. During this processing, the pixels of the current connected component are determined (using the pix_to_cc image) as those pixels within the bounding box calculated in step 1012 for which the pix_to_cc image value is the index of the current connected component. Processing for step 1016 is completed by setting the current connected component to be the parent of the current connected component.

Following completion of step 1016 processing returns to step 1010 from where steps 1010 to 1016 are repeated until either, the current connected component grows larger than parameter λ, or the current connected component does not have a positive excess value. The current connected component does not have a positive excess value when a neighbouring pixel in the input less excess values image 206 has image value above the image value of the current connected component.

At the completion of the first pass 1000 through the connected components in cc_list, described by the flow chart of FIG. 8, the excess values for all image regions of size less than or equal to λ which have input image values greater than all immediately neighbouring pixels, have been transferred from the input less excess values image 206 to the excess values image 802.

The second pass through the connected components list examines connected components for negative excess values in a manner similar to that described above for the first pass 1000. In the second pass, step 1012 determines an excess value for the current connected component which may be negative or zero and in step 1014 it is determined whether the excess is negative. Following the second pass through the connected components in cc_list 902, excess values have been transferred for all image regions of size less than or equal to parameter λ which either have image values greater than all immediately neighbouring pixels, or have image values less than all immediately neighbouring pixels. The resulting excess values image 802 contains isolated small regions of positive or negative excess values.

Referring again to FIG. 6, the map excess values process 804 is now described in more detail with reference to FIG. 9 where a data flow diagram of process 804 is shown. The map excess values process 804 consists of 3 sub-processes: a calculate excess values histogram process 1102; a make excess values map process 1106; and an apply excess values map process 1110. Process 1102 calculates a histogram 1104 of the excess values 802 which have been computed for the current tile of input image data 201. The histogram 1104 is used together with an excess value quantisation step size $\Delta_{excess}$ 1100 by process 1106 to calculate additional tile-specific excess value map parameters 1108. The excess value quantisation step size $\Delta_{excess}$ 1100 and the tile-specific map parameters 1108 together define a table of quantisation values and a tile-specific mapping of excess values to those quantisation values. Process 1110 applies this tile-specific mapping to excess values 802, generating mapped excess values 204 and an alternative, compact representation of those mapped excess values consisting of quantisation table indices 1112. The tile-specific map parameters 1108 and mapped excess value table indices 1112 provides alternative representation 1120 of the mapped excess value data 204.

On its own, the excess value quantisation step size $\Delta_{excess}$ specifies a default excess value mapping defined below. Tile-specific mappings, as defined below, when compared with the default quantisation mapping, generate the same number of non-zero mapped excess values, provide the same or reduced quantisation error and map to a similar number of quantisation values. The default quantisation mapping provides a minimum quality and coding efficiency across the image which is matched or exceeded by each tile specific mapping adjusted to the set of excess values it quantises.

Default Excess Value Quantisation

Figure 9:
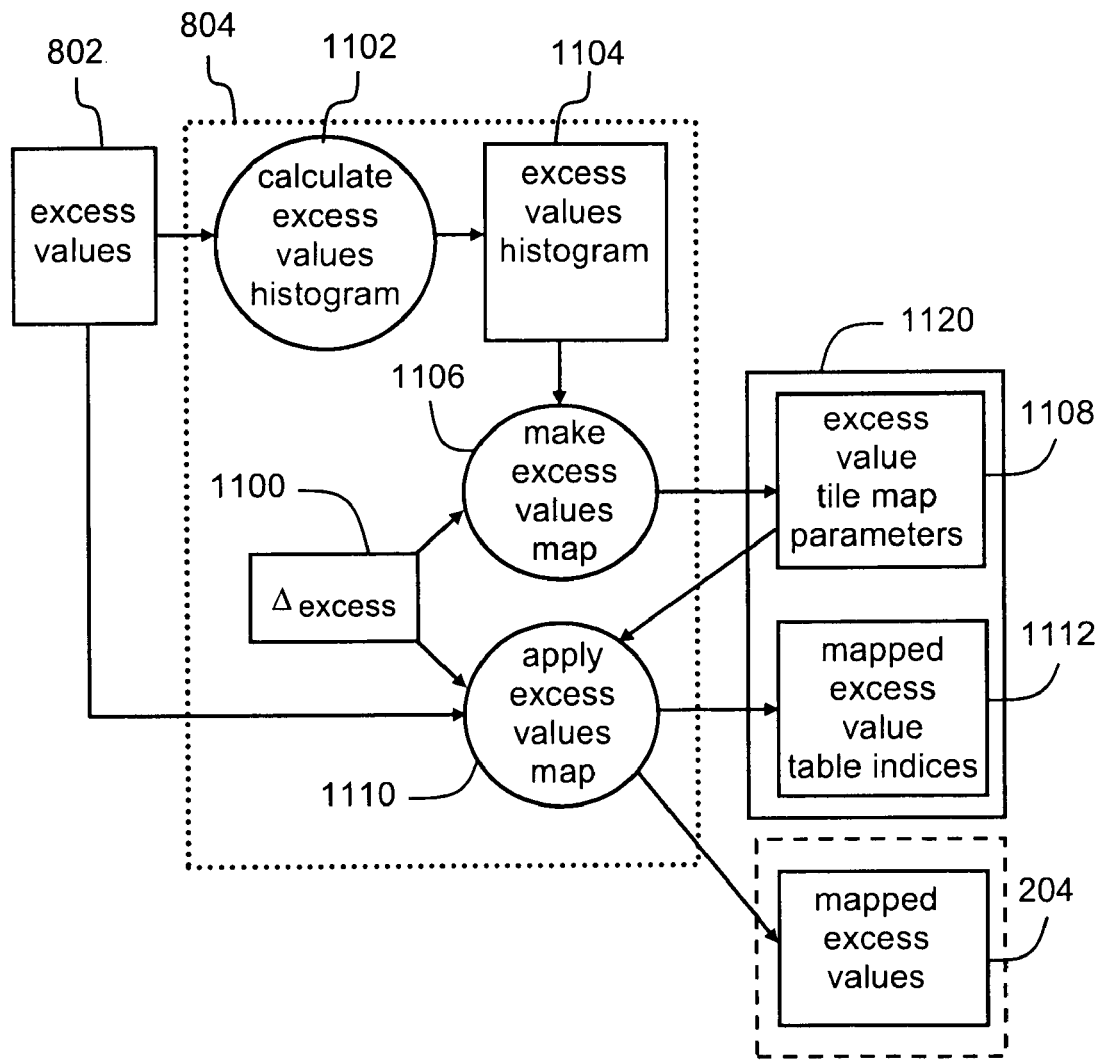
FIG. 9 is a data flow diagram of a map excess values process of FIG. 6.
Figure 10:
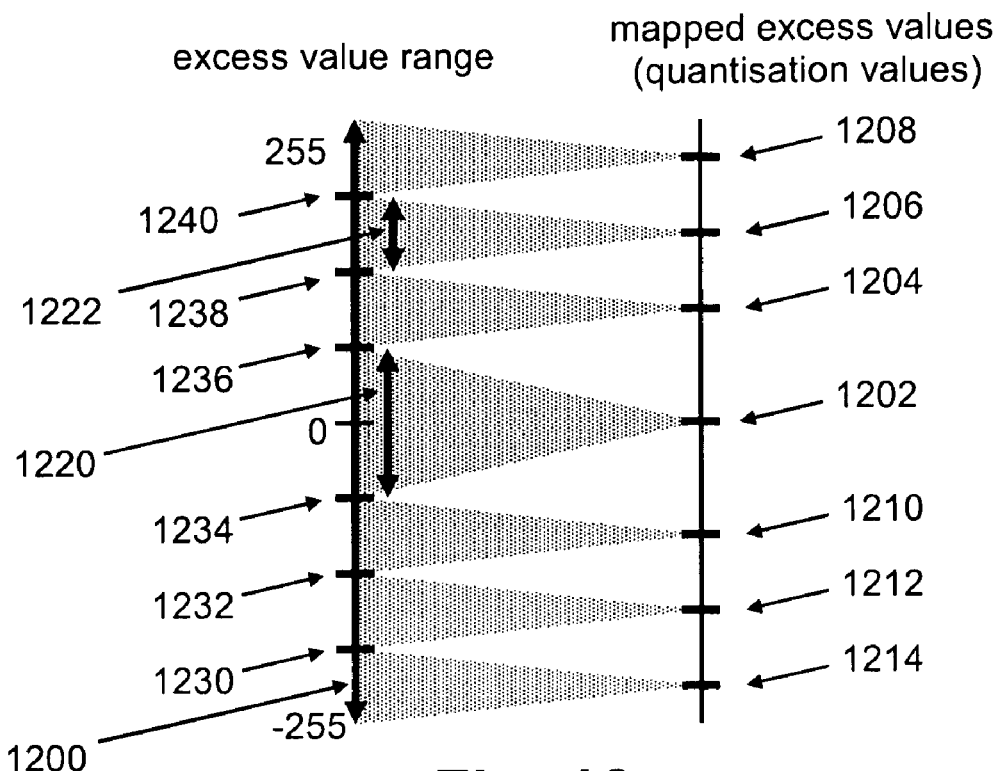
FIG. 10 provides a graphical representation of mapping excess values according to a default dead-zone uniform quantisation.

FIG. 10 illustrates a default excess value quantisation mapping and default mapped excess values. The range of excess values, being −255 through 255 when derived from 8 bit image values, is indicated by vertical line 1200 with arrows at each end. The default excess value mapping is uniform dead-zone quantisation, and is specified by the excess value quantisation step size $\Delta_{excess}$ 1100 (FIG. 9). In this default mapping, excess values are quantised according to the bin, or interval, the excess values are contained in. Bins consist of a zero bin and outer bins. The zero bin is the symmetric interval around zero, $(-\Delta_{excess}, \Delta_{excess})$ with width $2\Delta_{excess}$, and is indicated in FIG. 10 by double-arrowed line 1220. Each outer bin has width $\Delta_{excess}$. An example outer bin is indicated by double-arrowed line 1222. Mapped excess values, also known as quantisation values are positioned at the centre of the quantisation bins and are shown by cross lines 1202, 1204, 1206, 1208, 1210, 1212, 1214 along the vertical axis on the right of FIG. 10. The shaded triangles in the centre of FIG. 10 illustrate the fact that the quantisation mapping is a many-to-one mapping. Uniform dead-zone quantisation, for a quantisation step size $\Delta$, is described by the following equation which maps a value x to a quantised (or 'mapped') value Q(x).

$$Q(x) = \begin{cases} k\Delta + \frac{\Delta}{2} & \text{for} \quad k\Delta \leq x < (k+1)\Delta \quad \text{where } k = \lfloor \frac{x}{\Delta} \rfloor \text{ and} \\ & k = 1, 2, 3 \\ 0 & \text{for} \quad |x| < \Delta \\ -k\Delta - \frac{\Delta}{2} & \text{for} \quad -k\Delta \geq x > -(k+1)\Delta \quad \text{where } k = \lfloor \frac{-x}{\Delta} \rfloor \text{ and} \\ & k = 1, 2, 3 \end{cases} \quad (11)$$

Excess values in the zero bin 1220 map to a quantisation value of zero, shown as cross line 1202. Threshold values separating the bins are multiples of $\Delta_{excess}$ and are shown by cross lines 1230, 1232, 1234, 1236, 1238, 1240.

Tile-specific Excess Value Quantisation

The tile-specific map parameters consist of an array of quantisation bin flags and a palette or short list of particular excess values. Each flag in the array of quantisation bin flags specifies whether a particular quantisation bin, of the default excess value dead-zone quantisation mapping, and its quantisation value, is used or not. The list of excess value palette values specifies additional quantisation values.

The make excess values map process 1106 (FIG. 9) uses the histogram of excess values 1104 to calculate these tile-specific parameters. First, values for the array of quantisation bin flags are determined. The zero bin is considered as being always used and its quantisation bin flag is set to true. Where there is no non-zero histogram value occurring for an outer bin, the bin is considered as being not used and its bin flag is set to false. Where there is only one non-zero histogram value for an outer bin, the corresponding excess value is added to the palette of excess values and the bin is again considered as being not used and its bin flag is set to false. When there is more than one non-zero histogram value for an outer bin, the bin is considered as being used and its bin flag is set to true.

At this point, the array of quantisation bin flags and the palette define a first modified quantisation mapping which is similar to uniform dead-zone quantisation except that where an outer bin contains a palette value that palette value is used as the bin quantisation value. The array of quantisation bin flags and the palette values specify the set of quantisation values for this first modified quantisation mapping. Let the number of these quantisation values be N and let n be such that $2^{n-1} < N \leq 2^n$.

If the number of quantisation values N is not a power of 2, then additional quantisation values can be used without incurring any additional overhead in the number of bits required to code a quantisation value index. A follow up refinement procedure is used to conditionally determine alternative quantisation values as follows. When the number of excess values in outer bins with a non-zero histogram value is less than or equal to $2^n - 1$, all outer bin flags are set to zero and the palette of excess values is set to be those outer bin excess values with non-zero histogram values.

In all cases, the array of bin flags and the palette values define the set of quantisation values. The tile-specific excess value quantisation mapping is obtained from these quantisation values as follows. Excess values in the zero bin map to zero. Excess values in outer bins map to the closest quantisation value.

Figure 11:
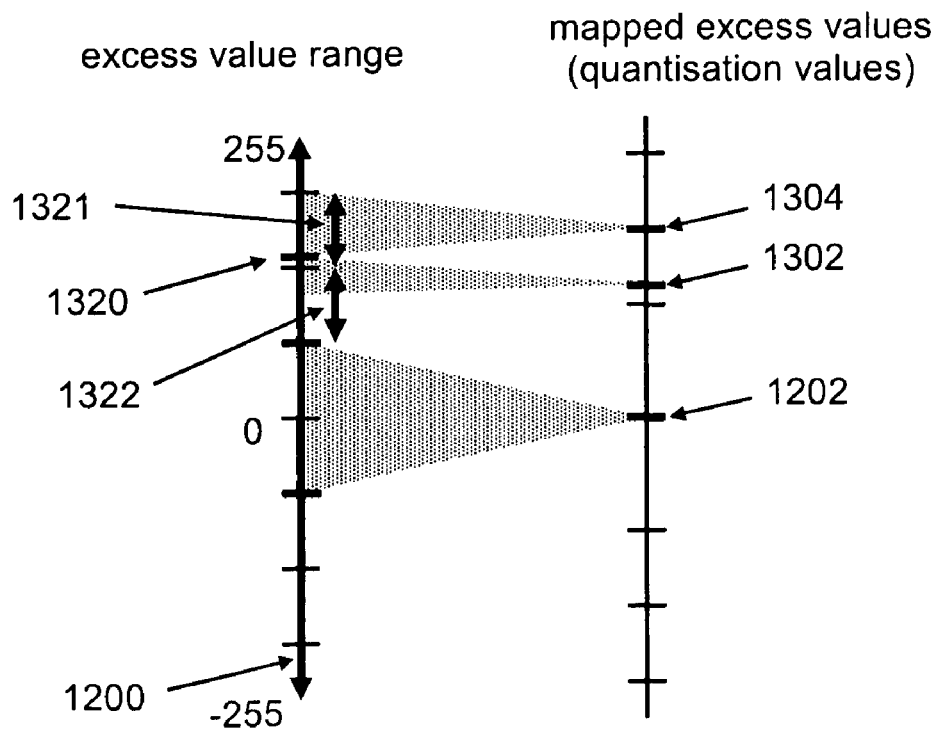
FIG. 11 provides a graphical representation of mapping excess values according to an example tile-specific quantisation mapping.

FIG. 11 illustrates an example tile-specific excess value quantisation mapping defined by the parameter $\Delta_{excess}$ and additional tile-specific map parameters 1108 (FIG. 9). The range of excess values to be quantised, −255 through 255, is indicated as in FIG. 10 by vertical line 1200. For the example shown there are 2 quantisation values 1302 and 1304 in addition to the zero quantisation value 1202. One of the quantisation values 1302 is a palette value. The other 2 quantisation values 1202 and 1304 are quantisation values of the default uniform dead-zone quantisation. For this example, there are only 2 outer bins which contain excess values of the tile. These outer bins are indicated by the short thick lines 1321 and 1322. Palette value 1302 is the only excess value of its outer bin with a non-zero histogram value. The outer bin with default quantisation value 1304 contains multiple excess values with non-zero histogram values. Threshold value 1320, positioned at the mid point between quantisation values 1302 and 1304, separate ranges of excess values which map to the same quantisation value. The shaded triangles in FIG. 11 indicate how excess values map to quantisation values.

Application of the Excess Value Quantisation Mapping

Continuing with the description of the map excess values process 804 (FIG. 9), once the tile map parameters 1108 have been generated by the make excess values map process 1106, tile excess values 802 are mapped using the apply excess values map process 1110. As seen above the excess value quantisation step size 1100 and the tile excess value map parameters 1108 determine the quantisation values and the mapping of excess values to those quantisation values. The quantisation values may be considered as a table of mapped excess values. Zero is the most commonly occurring excess value quantisation value. So the table is arranged to have the zero quantisation value as the first table entry with index value of zero for convenience in coding table indices. In the apply excess values map process 1110 each excess value of the tile excess values 802 generates a mapped excess value table index and a mapped excess value according to the tile excess value mapping, resulting in a tile of mapped excess value table indices 1112 and a tile of mapped excess values 204.
Excess Value Coding and Decoding.

Figure 14:
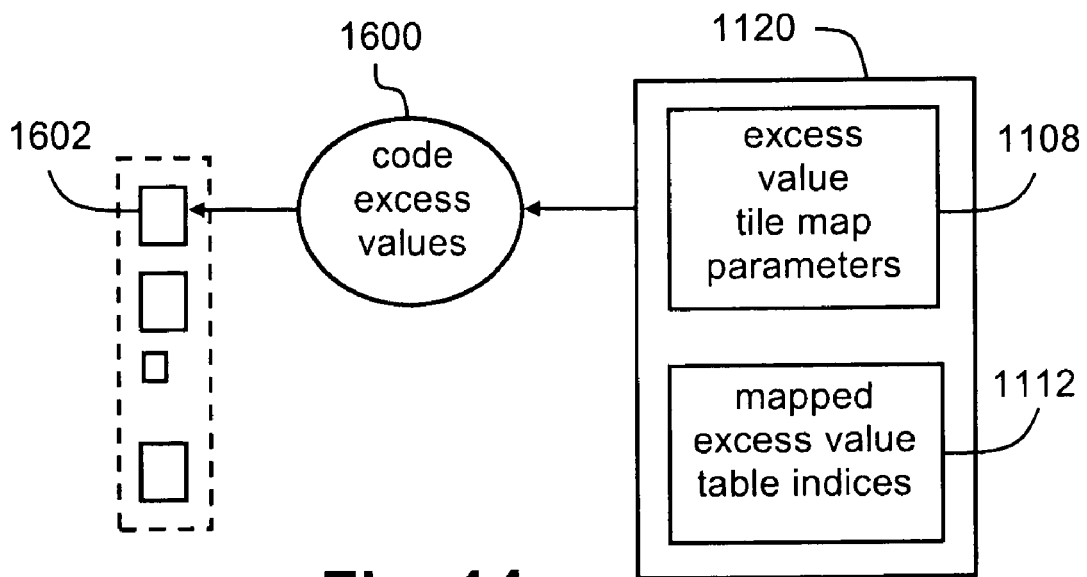
FIG. 14 is a data flow diagram of a code excess values process of FIGS. 2 and 4.

FIG. 14 provides a data flow diagram of the code excess values process 1600 as performed in encoding process 230 of FIG. 2 and encoding process 404 of FIG. 4. Knowledge of the excess value quantisation step size 1100 (FIG. 9) is assumed. As explained with reference to FIG. 9, the alternative representation 1120 of the mapped excess value data 204 is provided collectively by the excess value tile map parameters 1108 and the mapped excess value table indices 1112. In mapped excess value coding, it is this alternative representation 1120 which is preferably coded rather than the mapped excess value data 204 itself. The output from the code excess values process 1600 is coded mapped excess value data 1602. The coding method for the mapped excess value table indices 1112 is any suitable lossless image coding method.

Figure 15:
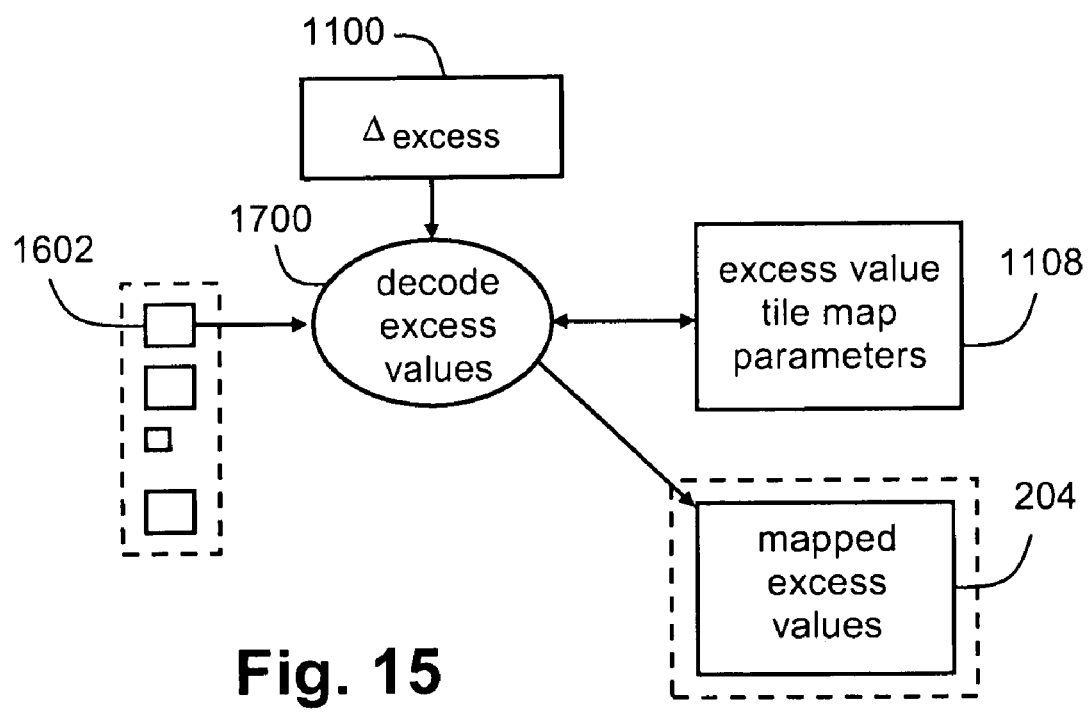
FIG. 15 is a data flow diagram of a decode excess values process of FIGS. 3 and 5.

FIG. 15 provides a data flow diagram of a decode excess values process 1700 as performed in decoding process 301 of FIG. 3 and decoding process 501 of FIG. 5. In this process 1700 firstly the part of the coded mapped excess value data for a tile 1602 containing tile map parameters is decoded to recover excess value tile map parameters 1108. The recovered excess value tile map parameters 1108 and excess value quantisation step size 1100 allow the reconstruction of the table of mapped excess values for the tile. Using this table allows recovery of mapped excess values 204 from the coded table indices in the remaining part of the coded mapped excess value data 1602.

Edge Run Extraction and Pixel Difference Mapping

Figure 16:
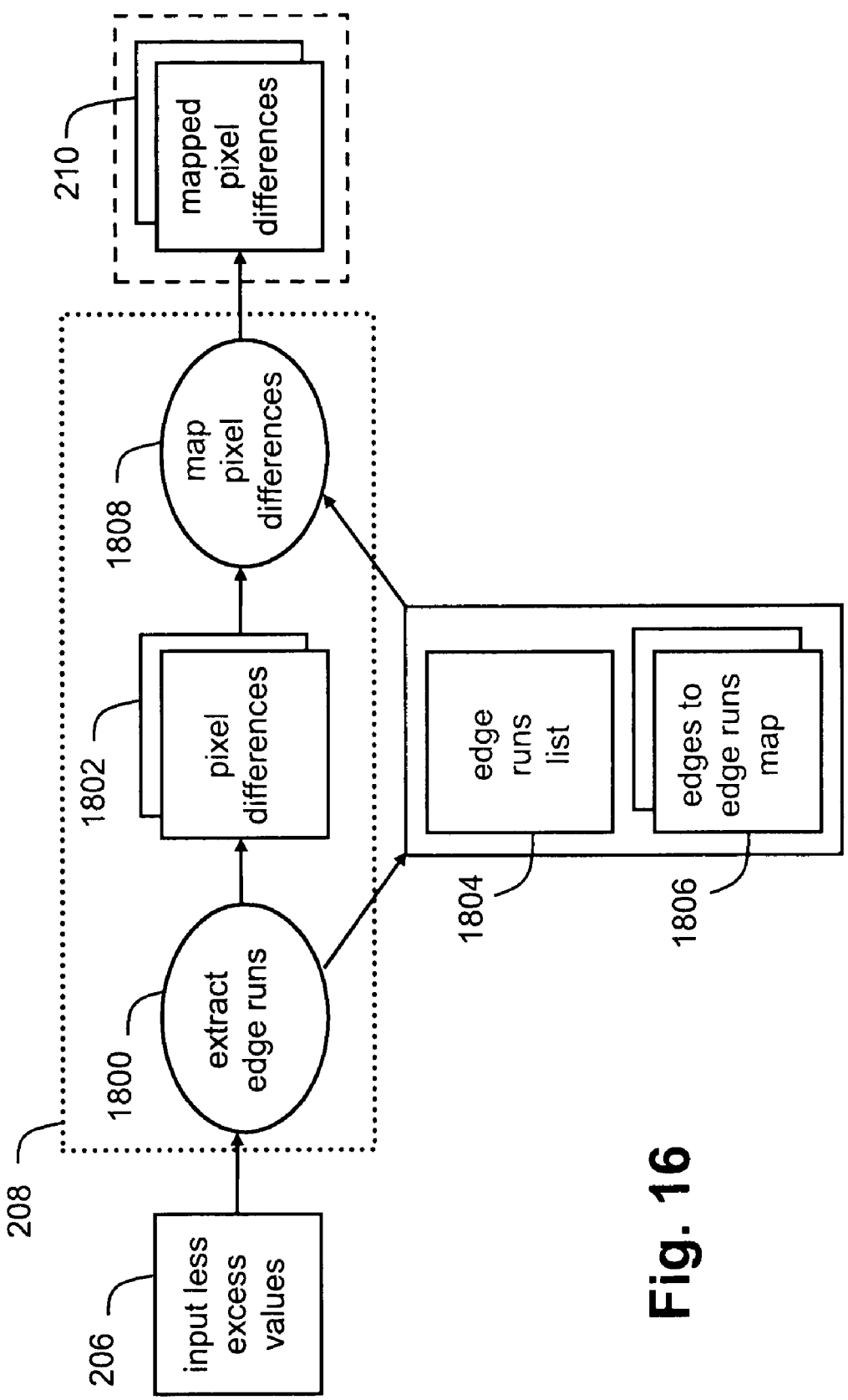
FIG. 16 is a data flow diagram of an extract edge runs and map pixel differences process of FIGS. 2 and 4.

The extract edge runs and map pixel differences process 208 as used in methods 200 and 400 of FIGS. 2 and 4 is now described with reference to FIG. 16 where a data flow diagram of process 208 is shown. The purpose of process 208 is to identify edge runs of visually significant edges and to quantise this edge run data in the form of mapped pixel differences 210. Each edge run consists of a sequence of pixel edge segments with successive pixel edge segments being linked at and sharing a pixel corner.

The extract edge runs and map pixel differences process 208 is made up of 2 sub-processes, an extract edge runs process 1800 and a map pixel differences process 1808. The extract edge runs process 1800 accepts image data for a tile, being input less excess values 206 and generates pixel difference data 1802, an edge runs list 1804 and a mapping from pixel edge segments to edge runs 1806. The map pixel differences process 1808 accepts the pixel difference data 1802, the edge runs list 1804 and the mapping from pixel edge segments to edge runs 1806 and generates mapped pixel difference data 210.

The pixel difference data 1802 consists of differences of image values for horizontally and vertically nearest neighbour pairs of tile pixels. The pixel border or pixel edge segment between each such pair of pixels may be considered as an edge between those pixels and each such edge may be part of at most one edge run. The edges to edge runs map 1806 specifies an edge runs list index value for each such edge, where the index value may be set to a special value (zero) to indicate that the edge is not part of any edge run. That is, the edges to edge runs map 1806 provides a record of the pixel edge segments which make up each edge run. Data stored for each edge run in the edge run list 1804 consists of a parent edge run index, a total edge run magnitude and a flag indicating whether the edge run is significant or not (the significance flag). The data for each edge run includes a parent run index in order to facilitate linking of pixel edge segments into edge runs in a single raster pass through pixel corners of the input less excess values image 206 as described below. The total edge run magnitude and the significance flag for an edge run are associated with edge run assessment. As with mapped pixel difference data 210 shown in this and previous diagrams, the pixel difference data 1802 and the edges to edge run map data 1806 are both depicted using two squares to indicate they consist of values for both horizontal and vertical edges.

Figure 17:
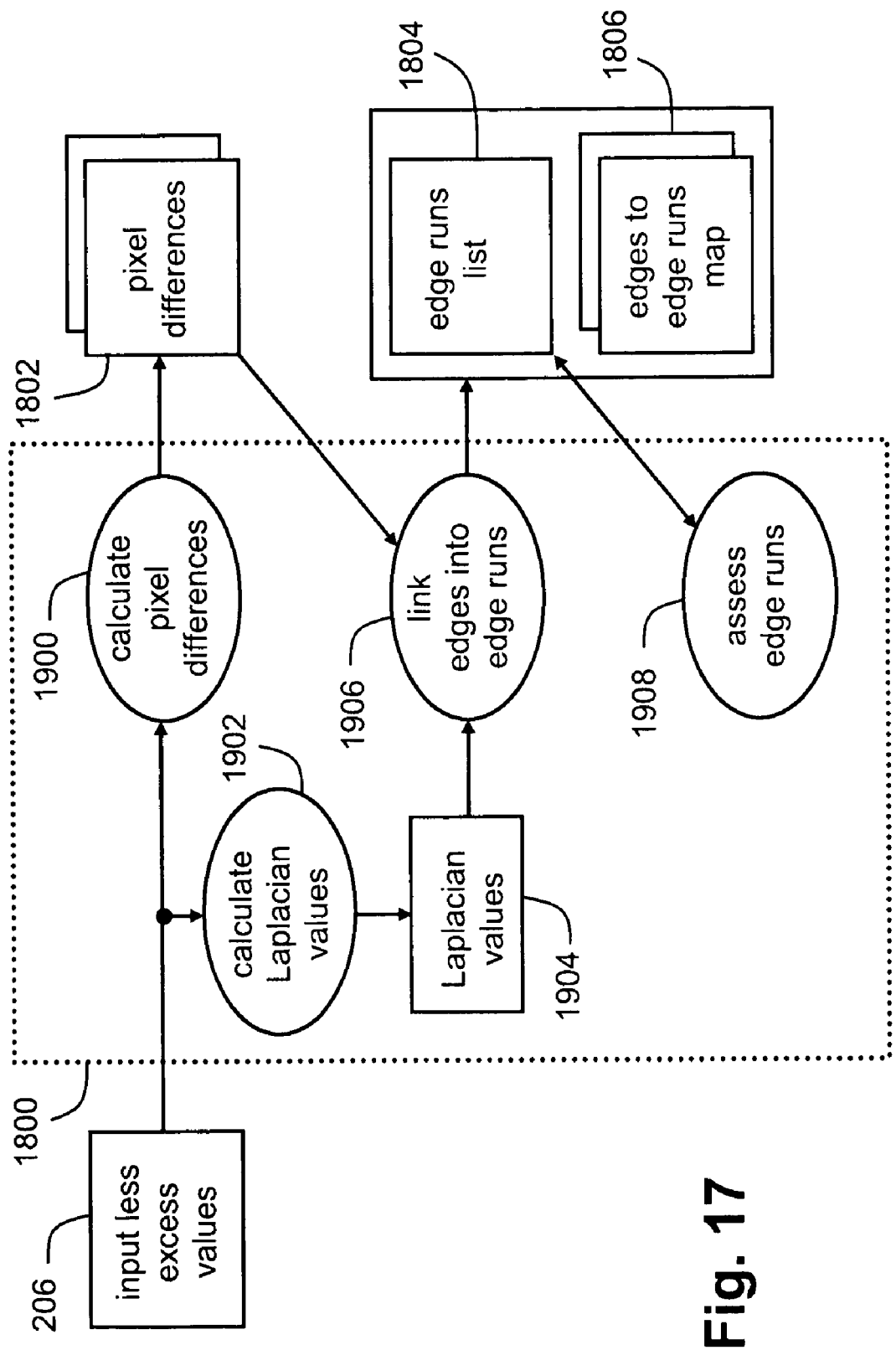
FIG. 17 is a data flow diagram of an extract edge runs process of FIG. 16.

A data flow diagram of the extract edge runs process 1800 is shown in FIG. 17. The extract edge runs process 1800 consists of 4 sub-processes: a calculate pixel differences process 1900; a calculate Laplacian values process 1902; a link edges into edge runs process 1906; and an assess edge runs process 1908. The calculate pixel differences process 1900 and the calculate Laplacian values process 1902 respectively generate pixel differences 1802 and Laplacian values 1904. Denoting the image values at row y and column x of a tile as im[x, y], horizontal pixel difference values, (im[x, y]−im[x−1, y]) and vertical pixel difference values, (im[x, y]−im[x, y−1]) are calculated by process 1900 from pixels of the input less excess values image 206. Laplacian values 1904 are obtained by convolution of the input less excess values image data 206 with the following filter:

$$\begin{bmatrix} 1 & 2 & 1 \\ 2 & -12 & 2 \\ 1 & 2 & 1 \end{bmatrix} \quad (12)$$

Laplacian values 1904 at border pixels of the image tile are obtained by convolution with the above filter after even symmetric extension of the image tile to a larger tile with an added row or column on each side of the image tile; that is by setting values for notional pixels just outside the image tile according to the value of the nearest pixel within the tile.

The link edges into edge runs process 1906 uses pixel difference data 1802 and Laplacian value data 1904 to generate an edge runs list 1804 and edges to edge runs map data 1806. This process operates one pixel corner of the input less excess values image tile at a time in raster order. At each pixel corner, 0, 1 or 2 pairs of pixel edge segments which meet at the corner are linked. The link edges into edge runs process 1906 is described below with reference to FIGS. 18, 19 and 20.

Linking Pixel Edge Segments at a Pixel Corner

Figure 18:
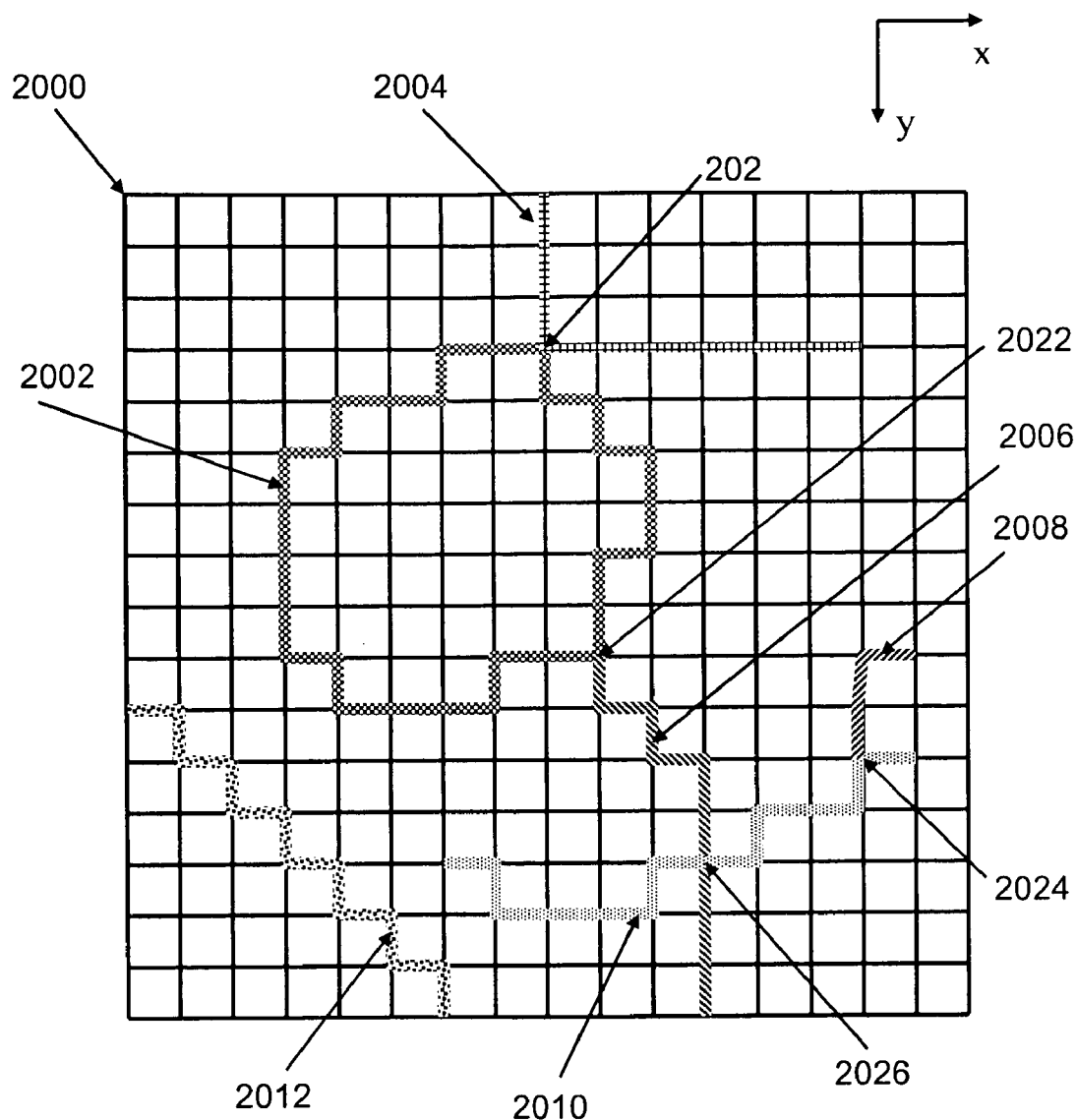
FIG. 18 depicts example edge runs as linked pixel edge segments.

FIG. 18 shows a tile 2000 of pixels containing example edge runs 2002, 2004, 2006, 2008, 2010, and 2012. Example configurations of linked pixel edge segments at pixel corners 2020, 2022, 2024 and 2026 are also shown. The tile size of tile 2000 is 16×16 pixels, which is smaller than the preferred tile size of 64×64 pixels, but it is a convenient size for depicting example edge runs and example configurations of linked edges at pixel corners. A pixel edge segment is the border between a pair of horizontally or vertically nearest neighbour pixels. Associated with each pixel edge segment is an edge value or pixel difference value being the difference of the image values of the pixels either side of the pixel edge segment. A pixel edge segment is 'above threshold' if the absolute value of its edge value is greater than or equal to an edge magnitude quantisation step size, $\Delta_{edge\_mag}$. A pixel edge segment extends between two pixel corners and belongs to at most one edge run. At a pixel corner a pixel edge segment may be linked to at most one other pixel edge segment. An edge run consists of a sequence of linked above-threshold pixel edge segments where each preceding pixel edge segment is linked to its succeeding pixel edge segment. In FIG. 18, each example edge run 2002, 2004, 2006, 2008, 2010, and 2012 is drawn with its own thick line pattern. An edge run may be a closed curve such as example edge run 2002, or a curve which is not closed such as example edge runs 2004, 2006, 2008, 2010, and 2012. The pixel corner at an end of an edge run which is a non-closed curve may occur at the tile boundary, such as for both ends of example edge run 2012; or, the end pixel corner may occur within the tile 2000, such as for both ends of example edge run 2010.

Figure 19:
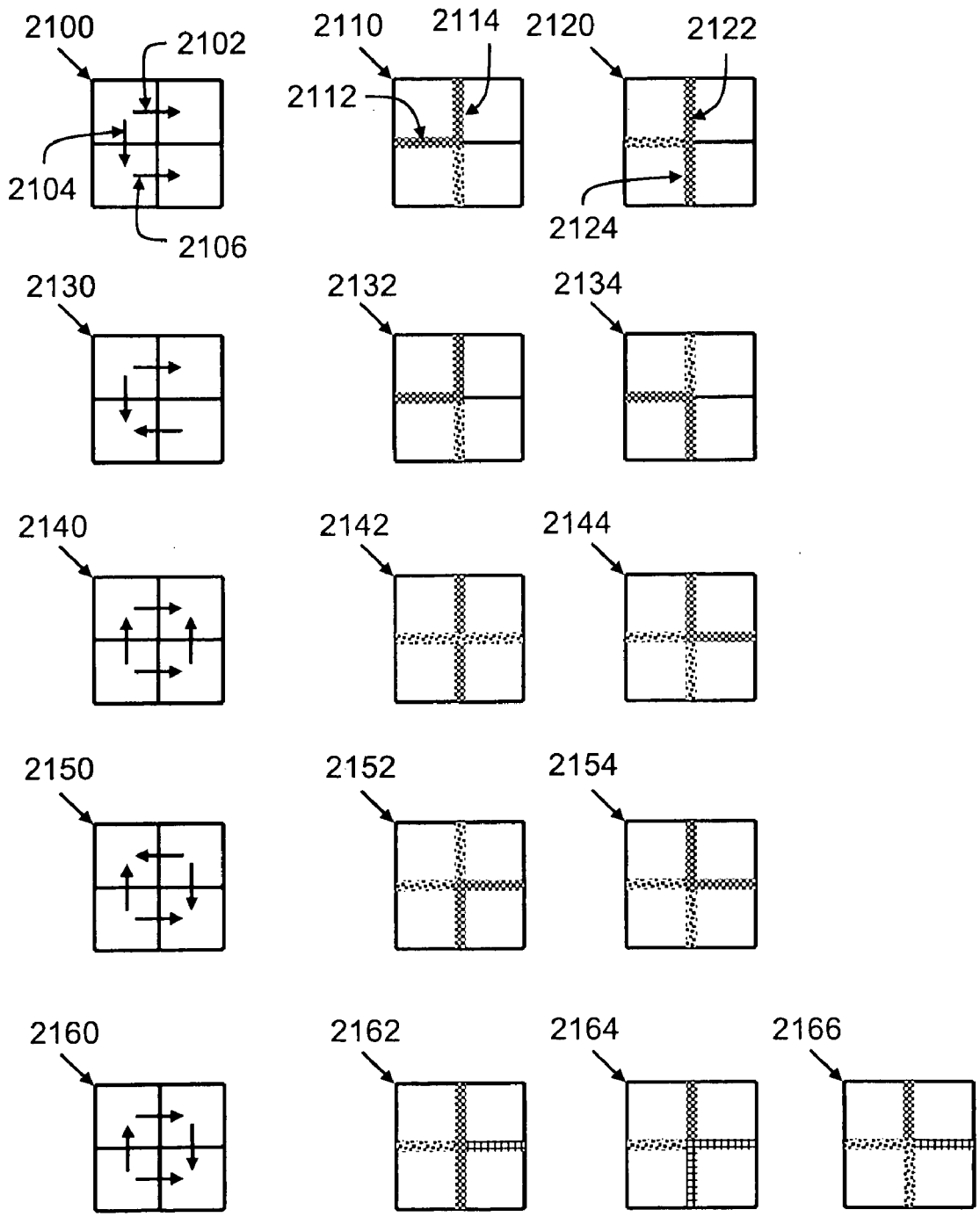
FIG. 19 depicts example configurations of edges at a pixel corner and possible linked edges for those configurations.

FIG. 19 shows example edge configurations at an internal (i.e. non-border) pixel corner and corresponding possible configurations of linked edges at a pixel corner corresponding to those edge configurations. Each configuration of edges at a pixel corner and each possible configuration of linked edges at a pixel corner is shown using a 2×2 block of pixels, with the pixel corner of interest at the centre of the 4 pixels. In the left column five configurations of edges at a pixel corner 2100, 2130, 2140, 2150 and 2160 are shown. To the right of each of these configurations of edges are 2×2 blocks of pixels showing possible configurations of linked edges corresponding to the particular configuration of edges in the left column. For example, on the top row of 2×2 blocks of pixels, the 2×2 blocks of pixels 2110, 2120 depict possible configurations of linked edges corresponding to the configuration of edges 2100.

In configuration 2100 there are three arrowed lines 2102, 2104, and 2106 drawn over three of the four pixel edges meeting at the central pixel corner. Each of these arrowed lines 2102, 2104, and 2106 indicates a change in image value from one pixel to another pixel. The direction of each of the arrowed lines 2102, 2104, and 2106 indicates the sign of the difference in image value between the two pixels marked by the arrowed line, with the arrow pointing towards the pixel with the higher image value. That is each of the arrowed lines 2102, 2104, and 2106 indicates the sign of the edge value of a pixel edge segment. The absence of an arrowed line over one of the four pixel edge segments meeting at the central pixel corner indicates that this pixel edge segment is not above threshold.

Pixel edge segments are linked according to a 'preservation of sign' rule so that as the edge run is traced from one edge to a succeeding linked edge the image value always increases from left to right across the edge or alternatively always decreases from left to right. This 'preservation of sign' rule, establishes whether a pair of above-threshold pixel edge segments are compatible (can be linked) or incompatible (cannot be linked). For example, the two pixel edge segments overdrawn with arrowed lines 2102 and 2104 are compatible and can be linked at the central pixel corner, whereas the pixel edge segments overdrawn with arrowed lines 2104 and 2106 are not compatible. Linking pixel edge segments while obeying this preservation of sign rule along the edge run results in just the two possible configurations of linked edge runs 2110, 2120 corresponding to the signed edge configuration 2100. In configuration 2110, pixel edge segments 2112 and 2114 are linked; whereas in configuration 2120, pixel edge segments 2122 and 2124 are linked.

Similarly, the configurations 2132, 2134 are the only two possible configurations of linked edge runs corresponding to the signed edge configuration 2130; the configurations 2142, 2144 are the only two possible configurations of linked edge runs corresponding to the signed edge configuration 2140; the configurations 2152, 2154 are the only two possible configurations of linked edge runs corresponding to the signed edge configuration 2150; and the configurations 2162, 2164, 2166 are the only three possible configurations of linked pixel edge segments corresponding to the signed edge configuration 2160.

Algorithm for Linking Pixel Edge Segments at a Corner

Figure 20:
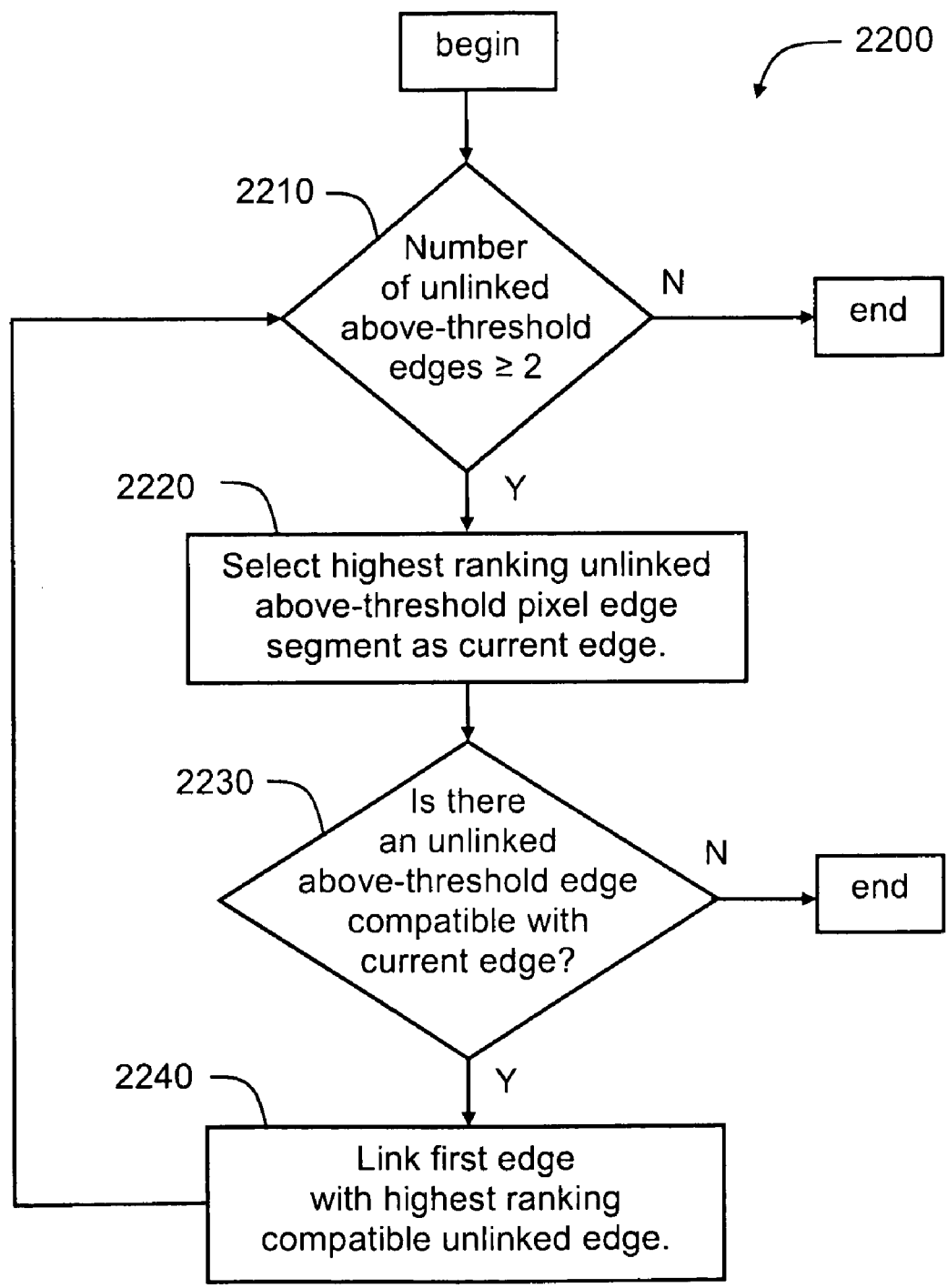
FIG. 20 is a schematic flow diagram of linking pixel edges at a pixel corner as used in a link edges into edge runs process of FIG. 17.

The particular configuration of linked pixel edge segments determined for a configuration of signed edge values at a pixel corner is decided by observing the compatibility of pixel edge segments according to the 'preservation of sign rule' and by a ranking of above-threshold pixel edge segments at a pixel corner from most significant to least significant described below. FIG. 20 shows a schematic flow diagram of a process 2200 for linking pixel edge segments at a pixel corner. The process 2200 starts in step 2210, where it is determined whether the number of unlinked above-threshold pixel edge segments is greater than or equal to 2. If it is determined that there are fewer than 2 above threshold edges at the pixel corner, then there are no edges to link and the link processing 2200 at the pixel corner ends.

If it is determined in step 2210 that there are 2 or more unlinked above-threshold edges at the pixel corner, then in step 2220 the edge which has the highest rank is selected as the current edge at the corner and processing proceeds to step 2230 where it is determined whether there is any unlinked above-threshold edge which is compatible with the current edge. If there is no compatible edge then there can be no pair of unlinked compatible above-threshold edges at the pixel corner and link processing 2200 at the pixel corner ends. If it is determined in step 2230 that there is a compatible unlinked above-threshold edge, then the edge with the highest ranking which is compatible, unlinked and above-threshold is linked with the current edge in step 2240 before processing returns to step 2210.

Ranking of the Pixel Edge Segments at a Pixel Corner

Referring again to FIG. 17, the ranking of pixel edge segments at a pixel corner is determined by the edge magnitudes (absolute pixel differences 1802) and the Laplacian values 1904 of the four pixels around the pixel corner. Pixel edge segments are largely ranked in significance according to their magnitudes. However, the magnitude of an edge may not reflect the visual significance of sharp perceived edge of which it is a part, because the perceived edge may be inclined and/or offset from the lines of the pixel grid. The value of using zero-crossings of Laplacian values 1904 for assisting the identification of visually significant edges is well known.

Pixel edge segments at a pixel corner are ranked firstly by categorising them according to the Laplacian values 1904 of pixels on either side of the pixel edge segment and secondly within each category ranking pixel edge segments according to their magnitude. The categories with rankings from highest to lowest are: 1) positive and negative Laplacian value 1904 on either side of edge; 2) positive and zero Laplacian value 1904 on either side of edge; 3) negative and zero Laplacian value 1904 on either side of edge and 4) any other arrangement of Laplacian values 1904 on either side of the edge.

Linking Pixel Edge Segments into Edge Runs

As noted above, the link edges into edge runs process 1906 (FIG. 17) operates on one pixel corner at a time of the input less excess values image tile 206 in raster order, updating the edge runs list 1804 and the edges to edge runs map 1806.

For each pair of pixel edge segments to be linked at a pixel corner, the 2 pixel edge segments of the pair are associated with an edge run in the edge runs list 1804. The edge run for the pair of pixel edge segments is determined according to one of the following cases. If neither pixel edge segment of the pair has been linked previously, then a new edge run is created in the edge runs list 1804 and becomes the edge run for the pair. If only one of the pixel edge segments of the pair has been linked previously (as part of a previous pair of pixel edge segments) then the edge run associated with that previously linked pixel edge segment becomes the edge run for the pair. If both of the pixel edge segments of the pair have been linked previously (as part of 2 previous pairs of pixel edge segments) then the edge run associated with those pixel edge segments which occurs earlier in the edge runs list 1804 is determined as the edge run for the pair and the edge run associated with the other pixel edge segment is superseded. Note that each linked pixel edge segment always belongs to one un-superseded edge run.

The data stored for each edge run includes a parent run index in order to be able to associate each superseded edge run with a superseding edge run. In this way, an edge run index can be assigned once to each pixel edge segment as that pixel edge segment is first linked and subsequently, by maintaining parent run index values, the top-level un-superseded edge run associated with a pixel edge segment can be retrieved from the edge run first associated with the pixel edge segment.

An edge run index is assigned to a pixel edge segment by setting the entry corresponding to the pixel edge segment in the edges to edge runs map 1806 with the (non-zero) edge run index value.

Long Edge Runs

The process 2200 (FIG. 20) of linking pairs of ranked, compatible pixel edge segments at pixel corners generates long edge runs which preferentially follow Laplacian zero crossings of the image. As such, these edge runs tend to follow the perceived edges of the image. Pixel edge segments having larger absolute pixel difference values tend to be linked together into dominant edge runs. Selection of edge runs which have higher sums of pixel difference values of their component pixel edge segments, selects pixel difference data which firstly is suited to compact coding as chains of pixel differences and which secondly contains dominant extended sharp edges. Consequently such edge runs provide a representation of sharp edges which can be compactly coded and which is suitable as input for generation of a piece-wise smooth edge-based image 220 which mimics visually significant sharp edges of the input less excess values image 212.

Alternative Ranking of Pixel Edge Segments at a Pixel Corner

Instead of ranking pixel edge segments using Laplacian values 1904 of the pixel on either side of the pixel edges, related alternative ranking schemes also give similar results. In one alternative ranking scheme, pixel edge segments at a pixel corner are ranked according to the magnitude of a value of a gradient which is not constrained to be aligned at 90 degrees to the pixel edge segment. Denoting as previously the image value at a pixel as im[x,y], a suitable 'direction-free' gradient value at the edge between pixels (x, y) and (x, y−1) is given by $$\text{grad} = (\text{grad}_x^2 + \text{grad}_y^2)^{1/2} \text{ where} \quad (13)$$

$$\text{grad}_x = \frac{1}{2}(im[x+1, y] - im[x-1, y] +$$

$$im[x+1, y-1] - im[x-1, y-1])$$

$$\text{grad}_y = \frac{1}{2}(im[x, y+1] + im[x, y] -$$

$$im[x, y-1] - im[x, y-2])$$

In another alternative ranking scheme, pixel edge segments at a pixel corner are ranked simply according to the magnitude of the pixel difference at the pixel edge.

Edge Run Assessment

As part of the link edges into edge runs process 1906 shown in FIG. 17, edge run statistics are gathered to allow later assessment of edge runs in process 1908. Prior to edge linking, the total edge run magnitude for each edge run, as recorded in the edge runs list 1804 is zero. As each pixel edge segment is included in an edge run, the total edge run magnitude for the top-level parent edge run of the edge run is increased by the magnitude of the pixel difference for the pixel edge segment, so the total edge run magnitude is maintained as the sum of pixel difference magnitudes along the edge run.

Further, for edge runs which end at another edge run or at the tile boundary, the total edge run magnitude for the top-level parent edge run of an edge run is increased as follows. When an edge run ends at a pixel corner at which there are other above-threshold pixel edge segments, the total edge magnitude of the edge run is increased by the highest magnitude of an edge at the corner which is compatible with the terminating edge of the edge run. That is, the total edge run magnitude of the edge run is increased as if the edge run continued through the pixel corner to that other edge. When an edge run ends at the tile boundary, the total edge run magnitude is increased by a second addition of the magnitude of the terminating edge. That is, the total edge run magnitude of the edge run is increased as if the edge run continued beyond the image tile with an edge identical to the terminating edge. These increases in the total edge run magnitude where the edge run terminates at another edge run or at the tile boundary adjusts the assessment of edge runs to better reflect their visual importance.

In the assess edge runs process 1908 each top-level parent edge run is examined using a qualification test. The total edge magnitude is compared with a system-wide edge run magnitude threshold value, and if greater than or equal to the threshold value, then the edge run is qualified (accepted); otherwise it is disqualified (rejected). The result of this assessment is recorded as the value of the significance flag in the edge run data for the edge run in the edge runs list 1804. Only pixel differences for edges of qualified edge runs are quantised and coded.

Pixel Difference Mapping

The map pixel differences process 1808, being a sub-process of process 208 (FIG. 16), is now described with reference to FIG. 21, as well as FIGS. 12 and 13. Process 1808 is similar to the map excess values process 804 described above with reference to FIGS. 9, 10 and 11. The map pixel differences process 1808 consists of 3 sub-processes: a calculate edge magnitude histogram process 2302; a make edge magnitude map process 2306; and an apply edge magnitude map process 2310. Process 2302 calculates a histogram 2304 of the edge magnitudes (absolute pixel differences) 1802 for pixel edge segments of qualified edge runs. In process 2302, edges of qualified edge runs are identified by using the edges to edge runs map 1806, the parent index data of edge runs and the significance flag of top-level parent edge runs in the edge runs list 1804. The histogram 2304 is used together with an edge magnitude quantisation step size $\Delta_{edge\_mag}$ 2300 by process 2306 to calculate tile-specific edge magnitude map parameters 2308.

Note that absolute pixel differences are mapped and coded rather than signed pixel differences. This reduction in the range of data to be coded from signed to unsigned values is possible because the edge linking process 1906 ensures that edges are only linked into an edge run when such edges are compatible (satisfying the 'preservation of sign' rule) with the result that each edge run preserves an edge sign along its length. Mapped pixel difference data is coded as unsigned edge magnitudes together with a sign for each edge run.

Figure 12:
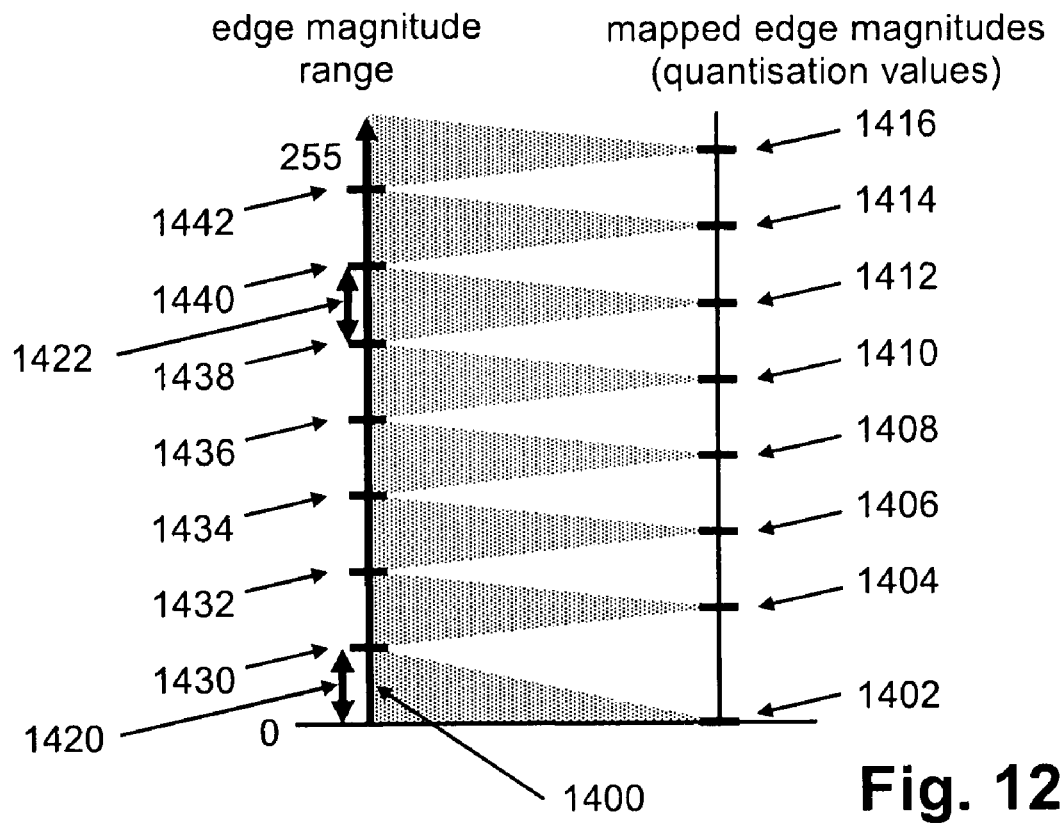
FIG. 12 provides a graphical representation of mapping edge magnitude values according to a default dead-zone uniform quantisation.

FIG. 12 illustrates a default quantisation mapping and default mapped values for edge magnitudes. The range of edge magnitude values, being 0 through 255 for 8 bit image values, is indicated by the vertical line 1400. The default edge magnitude mapping is uniform dead-zone quantisation, and is specified by the edge magnitude quantisation step size $\Delta_{edge\_mag}$ 2300. In this default mapping, edge magnitude values are quantised according to the bin, or interval, they are contained in. Bins consist of a zero bin and outer bins. The zero bin is the interval including zero, [0, $\Delta_{edge\_mag}$) with width $\Delta_{edge\_mag}$, and is indicated in FIG. 12 by double-arrowed line 1420. Values in the zero bin map to the zero quantisation value 1402. Each outer bin also has width $\Delta_{edge\_mag}$ and an example outer bin is indicated by double-arrowed line 1422. Edge magnitude values in an outer bin map to a quantisation value positioned at the centre of the outer bin. Outer bin quantisation values are shown by cross lines 1404, 1406, 1408, 1410, 1412, 1414, 1416 along the vertical axis on the right of the figure. The shaded triangles in the centre of FIG. 12 illustrate the fact that the quantisation mapping is a many-to-one mapping. Threshold values separating the bins are multiples of $\Delta_{edge\_mag}$ and are shown by cross lines 1430, 1432, 1434, 1436, 1438, 1440, 1442.

Tile-specific Edge Magnitude Quantisation

The quantisation of edge magnitudes for a tile of image data is adapted to the set of values to be quantised using the histogram 2304 of those values. The tile-specific quantisation is a refinement of the default uniform dead-zone quantisation. Similarly to excess value quantisation, the tile-specific quantisation of edge magnitudes does not allow a modification of the allocation of values to the zero bin, so that all edge magnitudes which map to zero under the default dead-zone quantisation continue to map to zero under the tile-specific quantisation.

Figure 21:
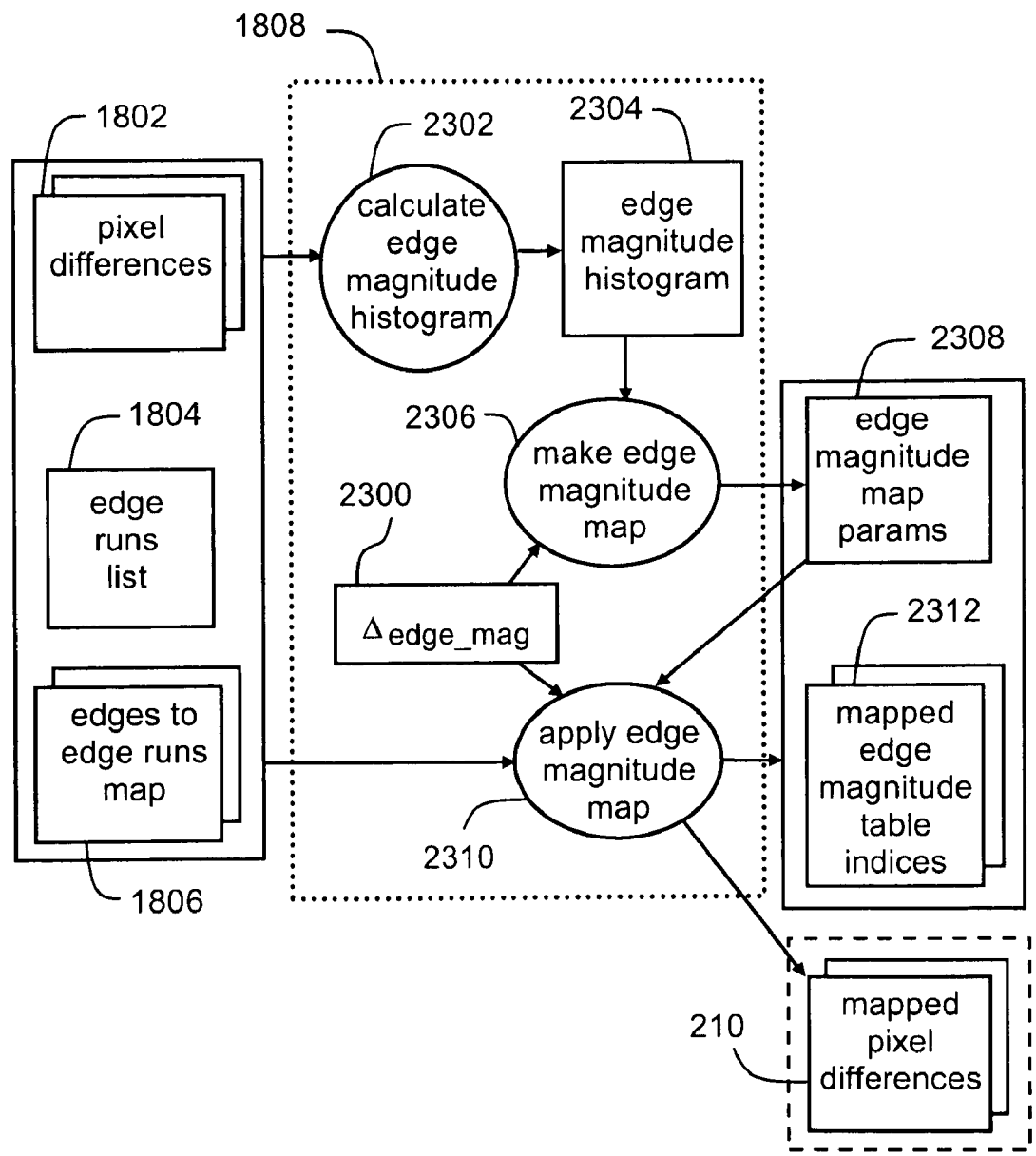
FIG. 21 is a data flow diagram of a map pixel differences process of FIG. 16.

The tile-specific edge magnitude quantisation is specified by tile-specific edge magnitude map parameters 2308 of FIG. 21 which consist of an array of outer quantisation bin flags and a palette or short list of particular edge magnitude values. Each flag in the array of outer bin flags specifies whether a particular outer bin, of the default edge magnitude dead-zone quantisation mapping, and its quantisation value is used or not. The list of edge magnitude value palette values specifies additional quantisation values. Note that as edge runs do not contain pixel edge segments with absolute pixel difference below the threshold value, $\Delta edge_{mag}$, mapped edge magnitude values of edge runs are non-zero. Consequently a zero edge magnitude quantisation value does not need to be coded. This is why the tile-specific edge magnitude map parameters do not include a flag for the zero bin.

The make edge magnitude map process 2306 of FIG. 21 uses the histogram of edge magnitude values 2304 to calculate these tile-specific parameters, in a similar way to the calculation of tile-specific excess value map parameters, as follows. First, values for the array of outer bin flags are determined. Where there is no non-zero histogram value occurring for an outer bin, the bin is considered as being not used and its bin flag is set to false. Where there is only one non-zero histogram value for an outer bin, the corresponding edge magnitude value is added to the palette of edge magnitude values and the bin is again considered as being not used and its bin flag is set to false. When there is more than one non-zero histogram value for an outer bin, the bin is considered as being used and its bin flag is set to true. Let the number of the used non-zero edge magnitude quantisation values be M and let m be such that $2^{m-1} < M \leq 2^m$.

If the number of non-zero edge magnitude quantisation values, M, is not a power of 2, then additional quantisation values can be used without incurring any additional overhead in the number of bits required to code a quantisation value index. A follow up refinement procedure is used to conditionally determine alternative quantisation values as follows. When the number of edge magnitude values in outer bins with a non-zero histogram value is less than or equal to $2^m$, all outer bin outer flags are set to zero and the palette of edge magnitude values is set to be those outer bin edge magnitude values with non-zero histogram values.

Figure 13:
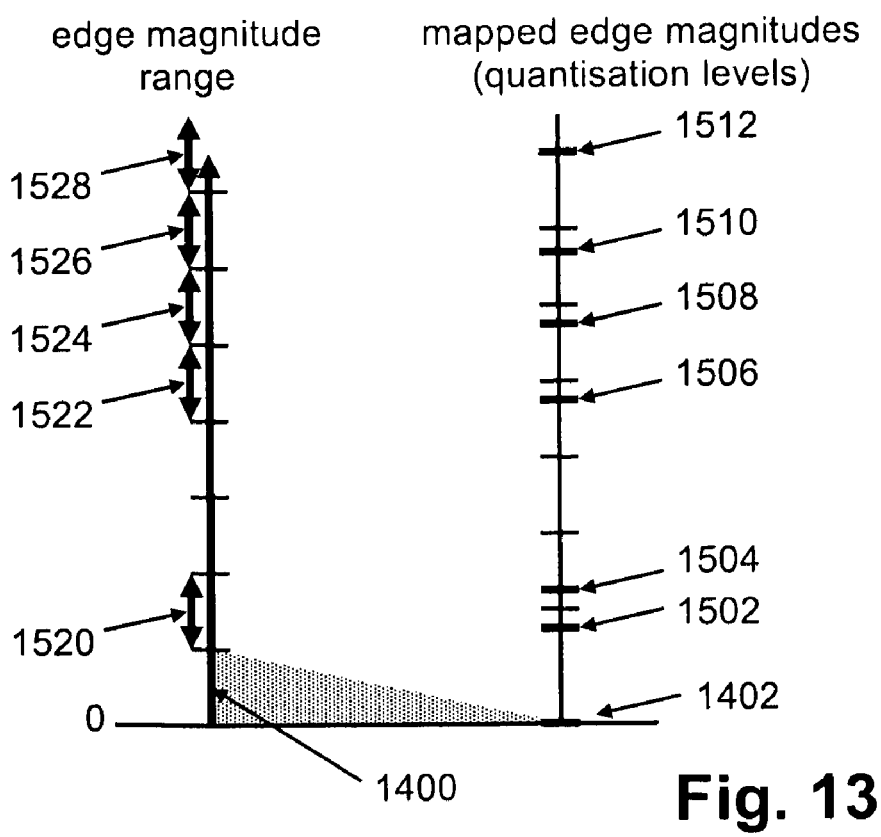
FIG. 13 provides a graphical representation of mapping edge magnitude values according to an example tile-specific quantisation mapping.

FIG. 13 illustrates an example tile-specific edge magnitude quantisation mapping defined by the parameter $\Delta_{edge\_mag}$ and additional tile-specific edge magnitude map parameters 2308. The range of edge magnitude values to be quantised, 0 through 255, is indicated as in FIG. 13 by vertical arrowed line 1400. For the example shown there are only 5 outer bins 1520, 1522, 1524, 1526, 1528 of the default quantisation which contain edge magnitude values of the tile. So the number of non-zero quantisation values used in the default dead-zone quantisation is M=5 and the least power of 2 exceeding this number is $2^m=8$. For the example, there are 6 edge magnitude values 1502, 1504, 1506, 1508, 1510, 1512, in outer bins with a non-zero histogram value. This is less than or equal to $2^m$; so the palette of edge magnitude values is set to be those 6 edge magnitude values and the quantisation bin flags for all outer bins are set to false. The corresponding example tile specific mapping, maps edge magnitude values in the zero bin to zero and preserves edge magnitude values in outer bins.

Application of the Edge Magnitude Quantisation Mapping

Continuing with the description of the map pixel differences process 1808 with reference to FIG. 21, once the tile edge magnitude map parameters 2308 have been generated by the make edge magnitude map process 2306, absolute values of tile pixel differences 1802 are mapped using the apply edge magnitude map process 2310. The edge magnitude quantisation step size 2300 and the tile edge magnitude map parameters 2308 determine the quantisation values and the mapping of edge magnitudes to those quantisation values. The quantisation values can be considered as a table of mapped edge magnitudes.

In the apply edge magnitude map process 2310 the absolute value of each pixel difference of the horizontal and vertical pixel differences 1802 which occurs at an edge of a qualified edge run, as determined using the edges to edge runs map 1806 and the edge runs list 1804, generates an index value into the table of edge magnitude quantisation values according to the tile-specific edge magnitude quantisation mapping. At the same time, in the apply edge magnitude map process 2310 the value of each of the pixel differences 1802 belonging to a qualified edge run, generates a corresponding signed mapped pixel difference value. For an edge which is not part of a qualified edge run, the corresponding edge magnitude table index and corresponding mapped pixel difference are set to zero. The output of the apply edge magnitude map process 2310 is a tile image of unsigned mapped edge magnitude table indices 2312 and a tile of signed mapped pixel difference values 210.

Figure 22:
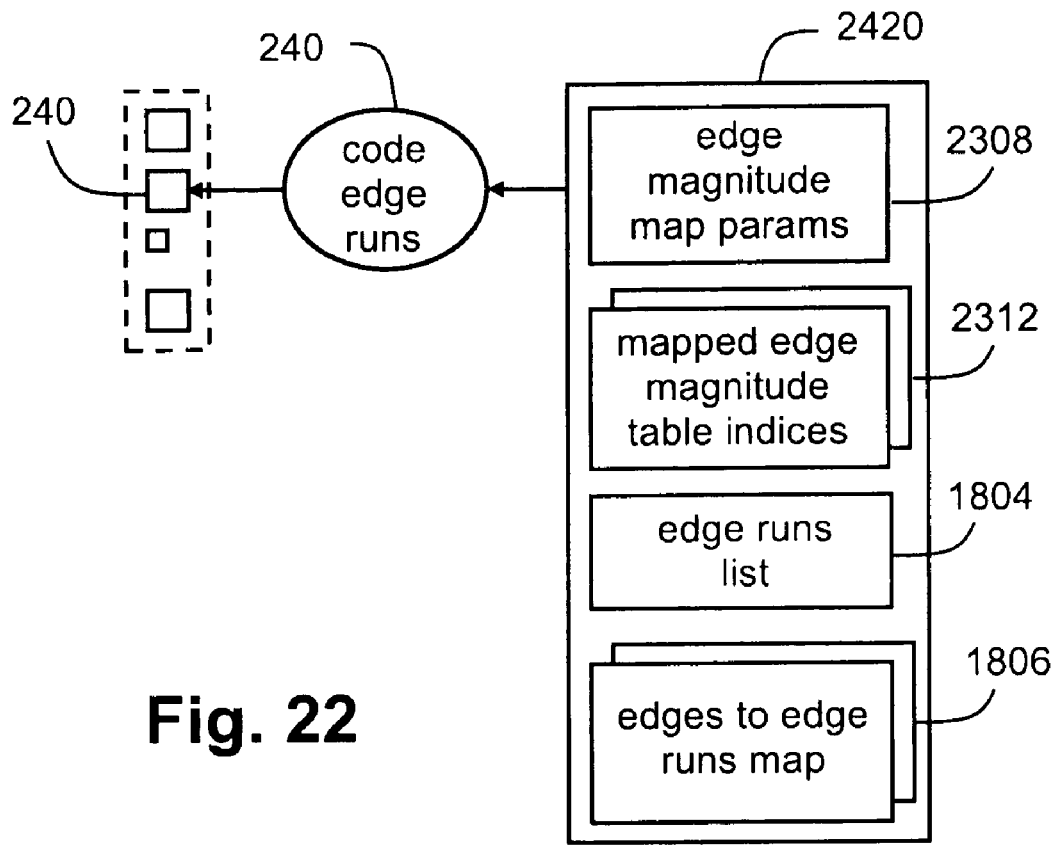
FIG. 22 is a data flow diagram of a code edge runs process of FIGS. 2 and 4.

Edge run coding and decoding FIG. 22 provides a data flow diagram of the code edge runs process 2400 as performed in encoding process 230 of FIG. 2 and encoding process 404 of FIG. 4. Assuming knowledge of the edge magnitude quantisation step size 2300, an alternative representation 2420 of the mapped pixel difference data 210 is provided collectively by the edge magnitude map parameters 2308, the mapped edge magnitude table indices 2312, the edge runs list 1804 and the edges to edge runs map 1806. In edge run coding, it is this alternative representation which is preferably coded rather than the mapped pixel differences 210 themselves. The code edge runs process 2400 first codes edge magnitude map parameters 2308 for a tile of image data, then it codes the mapped edge magnitude table indices 2312 and edge run sign information for qualified edge runs of the edge runs list 1804 for the tile. The output from the code edge runs process 2400 is coded edge run data 2402.

The encoding process 2400 is lossless so that mapped pixel differences can be exactly recovered in decompression. Typically, non-zero mapped pixel differences are relatively sparse within a tile and often edge values do not change greatly along an edge run. Compact coding of mapped pixel difference data is achieved by coding the data as edge runs. Each edge run is coded firstly as a path, being the sequence of edge positions of the edge run, secondly as a sign indicating whether edge values increase to left or right as the edge run is traced edge to edge from a starting pixel corner, and thirdly as a sequence of mapped edge magnitude values. Entropy coding may be used both for changes in direction in tracing the edge path and for changes in edge magnitude value along the edge path.

The coding can be performed using a single scanline pass through pixel corners (including pixel corners along tile borders but excluding pixel corners at tile corners) of the edges to edge runs map 1804 as follows. With this raster scan, qualified edge runs are determined using the edge runs list 1804. Once a qualified edge run is encountered at a pixel corner it becomes the current edge run being traced and coded. To code a current edge run its path of edges in the edges to edge runs map is traced and coded, its sign is coded and its edge magnitude table index values, as retrieved from mapped edge magnitude table indices data 2312 are coded. When another qualified, previously un-encountered edge run is encountered while tracing the current edge run, the index of the encountered edge run is pushed onto a stack, together with the pixel corner at which it was encountered, and a flag for its top-level parent edge run in the edge runs list 1804 is set to indicate that the edge run has been encountered. Setting this 'encountered' flag for a top-level parent edge run indicates that if the edge run is encountered again while tracing another edge run or if it is encountered later in the raster scan through the pixel corners, it should not be traced and coded again. Once an edge run is coded, if the edge run index stack is not empty, the last pushed edge run index and pixel corner are popped from the stack and that edge run becomes the current edge run to be traced and coded. Once an edge run is coded and the edge run stack is empty, the raster scan through pixel corners is resumed. It is only necessary to code the starting pixel corner of the path of an edge run first encountered during the raster scan of pixel corners. The starting pixel corner of paths of other edge runs can be coded as a flag along the path of a previously coded edge run.

Figure 23:
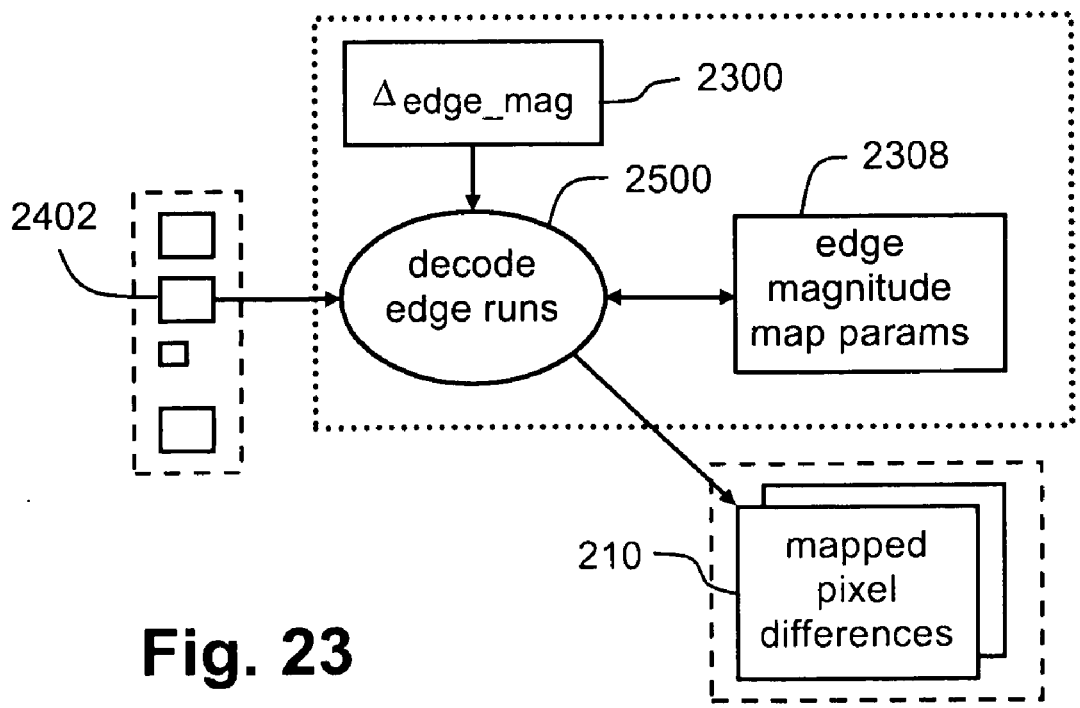
FIG. 23 is a data flow diagram of a decode edge runs process of FIGS. 3 and 5.

FIG. 23 provides a data flow diagram of the decode edge runs process 2500 as performed in decoding process 301 of FIG. 3 and decoding process 501 of FIG. 5. In the decode edge runs process 2500, firstly edge magnitude map parameters 2308 are recovered. Using the decoded edge magnitude map parameters 2308 and the edge magnitude quantisation step size 2300 a table of mapped edge magnitude quantisation values is constructed. Secondly, each edge run is decoded as a path, sign and a sequence of edge magnitude table index values. This edge run data is used together with the table of mapped edge magnitude quantisation values to recover mapped pixel difference values and their positions for the edge run. As a current edge run path is decoded, for any flag encountered representing the starting pixel corner of a subsequent edge run, the current pixel corner is pushed onto a stack to be popped when decoding the subsequent edge run. On completion of the decode edge runs process 2500 the mapped pixel difference data 210 as originally generated by the apply edge magnitude map process 2310 is recovered.

Suitable Values for System-wide Parameters

A suitable value for the threshold X used to calculate excess values, referred to in FIG. 8 as being the maximum size of a connected region of positive or negative excess values, is 10. A suitable value for the excess value quantisation step size $\Delta_{excess}$, labelled as 1100 in FIGS. 9 and 15, is 68. A suitable value for the edge magnitude quantisation step size $\Delta_{edge\_mag}$, labelled as 2300 in FIGS. 21 and 22, is 34. A suitable value for the total edge run magnitude threshold for accepting or discarding an edge run is 1000.

Special Case Lossless Edge Extraction

In the above description of the link edges into edge runs process 1906, only pixel edge segments which have a pixel difference magnitude which is above a threshold are linked. The advantage in using a threshold for edge linking is that it allows high significance edge runs to be obtained simply. The disadvantage in using a threshold for edge linking is that it fails to extract edge runs which have small pixel difference magnitudes but which may be long and significant.

It is possible to reduce use of an edge linking threshold and allow extraction of long edge runs with small pixel difference magnitudes with the following special case lossless edge extraction. Following decompose input image process 800, the number of different excess values is calculated. If this is less than or equal to a threshold then statistics are calculated for the input image less excess values tile 206. These statistics are the number of different image values, the number of different absolute pixel difference values and the number of pixel edges with non-zero pixel difference values. If all these calculated statistics are below suitable threshold values then excess values are compressed losslessly and all non-zero pixel differences are extracted as edge runs and compressed losslessly. In this case, in the link edges into edge runs process 1906, all pixel edge segments are considered to be above threshold and the assess edge runs process 1908 is skipped as all edge runs are considered significant.

This special case processing for an image tile proceeds according to the top level description for compression and decompression of image tiles with no data loss for pixel differences or for excess values as described above in relation to FIGS. 4 and 5. Suitable parameters for this second type of special case processing are threshold number of excess image values: 8; threshold number of input less excess value image values: 8; threshold number of absolute pixel difference values: 8; and threshold number of non-zero pixel difference values: 1000.

Colour Images

While the above description has been provided referring to compression and decompression of single colour channel images, the method can be readily applied to the compression and decompression of colour images.

In one scheme for colour images, the method described above can be applied to each colour plane. In other schemes, gradient data and low resolution data can be coded in a derived colour plane. For example, colour image values may be converted to a colour space including a luminance component, such as YUV or YCbCr. Performing image compression for the luminance channel according to the embodiment described above and performing JPEG-only compression for the chrominance channels is an attractive option as it is known that the human visual system is more sensitive to edges in the luminance data than edges in the chrominance data.

In another scheme for colour images, edge based image tiles for a colour plane can be reconstructed from 3-dimensional pixel difference data and low resolution data. In this case, pixel difference data may be preferentially coded using edge contours which are common to the colour channels, exploiting redundancy in edge contours across colour planes.

Tile-based Compression with Compression Method Selected According to Tile Content As noted in the background section, an approach to mixed content image compression is to compress each block of an image separately using one of a small set of image compression methods selected according to the image block content.

Similarly, the previously described methods of edge extraction as excess values and edge runs can be used in a tile-based compression system as one of the compression methods to be selected for a tile based on image tile content. Image tiles consisting of a small number of colours or grey levels, for example bi-level image data of black text on a white background, can be effectively compressed using conventional lossless compression methods. Image tiles containing photographic image data without sharp edges can be effectively compressed using DCT coding. Image tiles which are neither suited to lossless coding nor DCT coding can be compressed using the previously described methods of edge extraction as excess values and edge runs. This approach of selecting a compression method according to tile content and applying edge extraction only to particular tiles has the advantage that for many tiles only comparatively simple processing is required. The comparatively complex processing of edge extraction as excess values and edge runs is restricted to those tiles for which it is likely to provide improved compression performance over conventional lossless coding or DCT coding.

Figure 27:
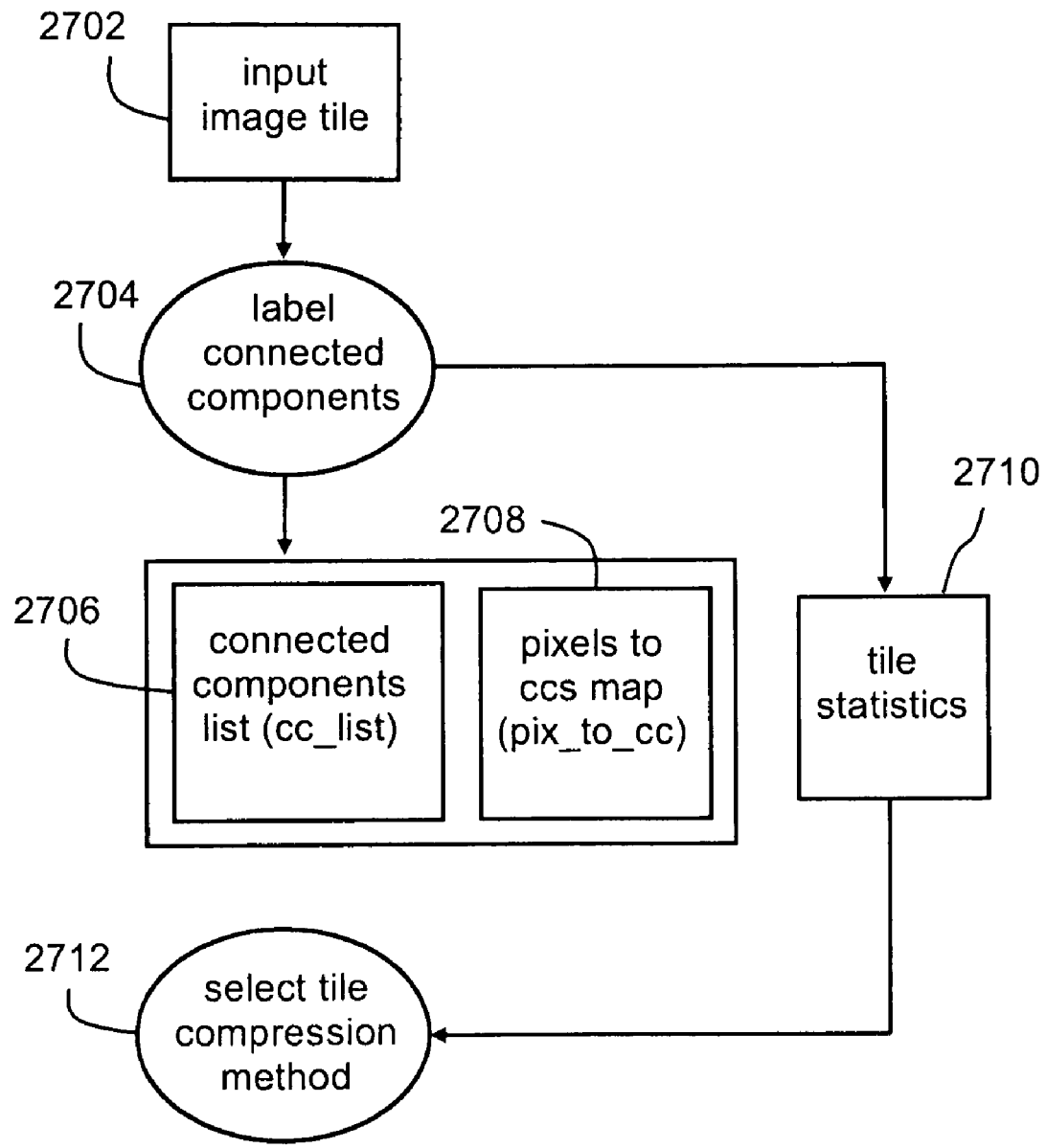
FIG. 27 is a data flow diagram describing selection of a tile compression method according to tile content.

A method of tile-based compression using tile-selected compression methods including image compression using edge extraction as excess values and edge runs is now described. FIG. 27 shows a data flow diagram illustrating selection of a compression method for an image tile according to image tile content. The input image data 2702 of FIG. 27 may be single colour channel image data or it may be colour image data consisting of multiple colour channels. In the current description the input image data 2702 is considered to be colour image data. Input image tile data 2702 is applied to a label connected components process 2704 which generates a connected components list 2706 and mapping from pixels to indices of connected component list elements 2708. The label connected components process 2704 is similar to the label connected components process 900 of FIG. 7 with the following 2 exceptions. Firstly, in the label connected components process 2704 neighbouring pixels are considered to belong to the same connected component if their image values match for all colour channels. Secondly, during execution of the label connected components process 2704 tile statistics 2710 are gathered for the input image tile 2072 being the number of colours, the number of pixels in connected components of small area, the magnitude of the largest pixel difference value and the size of the largest connected component.

The compression method for the tile is selected in step 2712 based on statistics 2710 as follows. If the number of colours is less than a threshold or the number of pixels in small connected components is below a threshold then the image tile is compressed using a conventional lossless compression method. If the number of colours is large and the number of pixels in small connected components is large and there are no large pixel difference values and no large connected components then the image tile is compressed using DCT coding. Otherwise each colour channel of the image tile is compressed using edge extraction as excess values and edge runs in a fashion similar to the previous description of compression of a single colour channel image tile. Other or additional tile statistics can be gathered to refine the classification of tiles.

When applying compression process 200 or 400 in this context, the colour connected component data generated by the label connected components process 2704 can be used by the transfer excess values process 906 of FIG. 7 so it is not necessary to perform the label connected components process 900 of FIG. 7. However, when the colour connected component data is interpreted as single colour channel connected component data it is possible that the single colour channel connected components are not fully merged. Consequently the transfer excess values process 906 as described using FIG. 8 is also modified in step 1012 to perform additional connected component merging as required. This modification is described for the case of transfer of positive excess values. In step 1012 when the border of the current connected component is traced, if it is identified that the current connected component has neighbouring pixels with the same image value as the current connected component and that all neighbouring pixels have image value less than or equal the connected component image value, then the current connected component is merged with neighbouring connected components of the same image value.

Compression of an Image Content Layer Resulting from Image Content Segmentation

The previously described methods of image compression using edge extraction as excess values and edge runs can also be applied to compression of an image content layer resulting from prior segmentation of image content into separate image content layers. That is, the segmentation approach to mixed content image compression as known in the art and image compression using edge extraction according to the present disclosure can be combined. In this case results of connected component labelling can be used both for image content layer generation and image compression using edge extraction.

Aspects of this Disclosure

The following Roman numbered paragraphs represent a summary of certain other aspects of this disclosure.

(I) A method of forming a representation of an original image so as to facilitate compression of said original image, said method comprising the steps of:
  (a) extracting edge data from said original image;
  (b) convolving said edge data with at least two edge fields to produce an edge image; and
  (c) subtracting said edge image from said original image to produce a residual image, wherein said representation comprises at least said edge data and said residual image, and wherein the sum of a difference of each edge field equals a unit impulse, and said edge fields have values which diminish in magnitude from a central position.

(II) A method according to paragraph (I), further comprising the step of downsampling said original image to form a low resolution image, said representation further comprising said low resolution image.

(III) A method according to paragraph (II), further comprising, before step (c), the step of:
  (bz) correcting said edge image using said low resolution image.

(IV) A method according to paragraph (I), (II) or (III) wherein said image is partitioned into tiles and said steps are carried out on each tile.

(V) A method according to paragraph (I), wherein said edge data comprises horizontal edge data and vertical edge data.

(VI) A method according to paragraph (V), wherein step (b) comprises the sub-steps of:
  (ba) convolving said horizontal edge data with a horizontal edge field to produce a horizontal edge image;
  (bb) convolving said vertical edge data with a vertical edge field to produce a vertical edge image; and
  (bc) combining said horizontal edge image with said vertical edge image.

(VII) A method according to paragraph (VI), wherein said difference of the vertical edge field is a horizontal difference and said difference of the horizontal edge field is a vertical difference.

(VIII) A method according to paragraph (VI), wherein said convolutions are calculated scanline by scanline in a single pass through the scanlines of the edge data.

(IX) A method according to paragraph (VI), wherein said convolutions are calculated by a downward pass and an upward pass through the scanlines of the edge data.

(X) A method according to paragraph (V) in which said edge image is produced scanline by scanline substantially as the sum of:
  (i) a 1D convolution of a horizontal edge filter with the sum of previous scanline data of said edge image and said horizontal edge data, and
  (ii) a 1D convolution of a vertical edge filter with said vertical edge data, wherein a difference of the vertical edge filter plus the horizontal edge filter equals a unit impulse.

(XI) A method according to paragraph (I), wherein said residual image is encoded using blockwise transform encoding.

(XII) A method of compressing an original image, said method comprising the steps of:
  obtaining said original image from a source;
  forming a representation of said original image according to the method of paragraph (2);
  encoding each of said edge data, said low resolution image and said residual image to form the compressed original image.

(XIII) A method according to paragraph (XII), further comprising repeating said method steps by treating said low resolution image as said original image to obtain a further level of compression.

(XIV) A method of decompressing a compressed image, said compressed image being formed according to paragraph (XII), said method comprising the steps of:
  decoding said compressed image to form said edge data, said low resolution image, and said residual image;
  forming an edge image using said low resolution image and said edge data;
  downsampling the edge image,
  subtracting the downsampled edge image from the low resolution image to form a remainder;
  combining the remainder, the residual image and the edge image to form output image data.

(XV) A method of processing an original image, said method comprising the steps of:
  obtaining low resolution image data associated with said original image;
  forming summed image data being substantially equal to the sum of:
    (a) a convolution of horizontal edge gradient data associated with said original image with a horizontal edge field, and
    (b) a convolution of vertical edge gradient data associated with said original image with a vertical edge field,
  where a horizontal difference of the vertical edge field plus a vertical difference of the horizontal edge field equal a unit impulse, and the horizontal and vertical edge fields have values which diminish in magnitude from a central position; and
  forming approximate image data from said summed image data and said low resolution image data.

(XVI) A method according to paragraph (XV), further comprising calculating residual image data.

(XVII) A method according to paragraph (XV), wherein said approximate image data is calculated by:
  downsampling of said summed image data
  subtracting the downsampled summed image data from said low resolution image data to form remainder data; and
  upsampling the remainder data; and
  adding said summed image data and the upsampled remainder data.

(XVIII) A method according to paragraph (XVI), wherein the processing comprises decompression, and decompressed image data is determined by:
  calculating said residual image data using quantised image transform data; and
  adding said approximate image data to said residual data.

(XIX) A method according to paragraph (XV), wherein said convolutions are calculated scanline by scanline in a single pass through the scanlines of the edge gradient data.

(XX) A method according to paragraph (XV), wherein said convolutions are calculated by a downward pass and an upward pass through the scanlines of the edge gradient data.

(XXI) A method according to paragraph (XV) in which said summed image data is formed scanline by scanline substantially as the sum of:
  (a) a 1D convolution of a non-zero horizontal edge filter with the sum of previous scanline data of said summed image data and horizontal edge scanline data, and
  (b) a 1D convolution of a non-zero vertical edge filter with vertical edge scanline data,
  where a difference of the vertical edge filter plus the horizontal filter equals a unit impulse.

(XXII) A method of decompressing a compressed representation of an original image, said compressed representation comprising edge data and a low resolution version of said original image, said method comprising the steps of:
  (a) convolving said edge data with at least two edge fields to produce an edge image; and
  (b) correcting said edge image using said low resolution image to form said decompressed image,
  wherein the sum of a difference of each edge field equals a unit impulse, and said edge fields have values which diminish in magnitude from a central position.

(XXIII) A method according to paragraph (XXII), wherein said compressed representation further comprises a residual image, said method further comprising the step of combining said residual image with said corrected edge image.

INDUSTRIAL APPLICABILITY

The arrangements described are applicable to the computer and data processing industries and particularly to the storage of documents comprising mixtures of photographic image data and other data such as text and/or graphic object data. Specifically, the arrangements described afford a representation of image data which facilitates compression, the compression for example being able to be performed using traditional approaches (e.g. JPEG). The arrangements described also allow for compression and decompression in comparatively low memory environments. Whilst the arrangements described are configured for and desirably used upon mixed content image, such does not preclude them from being applied to single content images, although the described advantages may not be revealed in such circumstances. The input image, when compressed using the arrangements described herein, may be recorded or stored upon a computer readable medium. A computer readable medium having a compressed image recorded thereon, the compressed image being formed from a representation, such as the representation 250, represents another aspect of the present disclosure.

The foregoing describes only some embodiments of the present invention, and modifications and/or changes can be made thereto without departing from the scope and spirit of the invention, the embodiments being illustrative and not restrictive.

(Australia Only) In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of compressing an input image, said method comprising:
   (a) extracting image gradient data from said input image, said image gradient data representing pixel differences along contours of said input image;
   (b) forming an edge based image from said image gradient data and a low resolution image derived from said input image;
   (c) computing a residual image representing a difference between said edge based image and said input image; and
   (d) compressing said input image by encoding said image gradient data, said low resolution image, and said residual image.

2. The method according to claim 1, wherein said extracting comprises decomposing said input image into an intermediate image and an excess values image, wherein said intermediate image contains long contours of the input image substantially unchanged and is substantially free of short closed contours; and said encoding of image gradient data comprises encoding said excess values image as pixel data and encoding said intermediate image as edge run data.

3. The method according to claim 2, wherein said intermediate image is obtained by transferring said excess values image from said input image.

4. The method according to claim 3, wherein said low resolution image is obtained by downsampling said intermediate image, and said residual image is obtained by subtracting said edge based image from said intermediate image.

5. The method according to claim 4, further comprising the step of extracting, from said intermediate image, a pixel differences image comprising pixel difference values along contours of said intermediate image, wherein said encoding of said intermediate image encodes said pixel differences image as edge run data.

6. The method according to claim 3, further comprising the steps of:

mapping said excess values image to form a mapped excess values image;

subtracting said mapped excess values image from said input image to form an input less mapped excess values image;

wherein said low resolution image is obtained by downsampling said input less mapped excess values image, said residual image is obtained by subtracting said edge based image from said input less mapped excess values image, and said encoding of said excess values image encodes said mapped excess values image.

7. The method according to claim 6, further comprising the step of extracting, from said intermediate image, a pixel differences image comprising pixel difference values along contours of said intermediate image, wherein said encoding of said intermediate image encodes said pixel differences image as edge run data.

8. The method according to claim 2, wherein said intermediate image is obtained by median filtering said input image, and said excess values image is obtained by subtracting said intermediate image from said input image.

9. The method according to claim 8, further comprising the steps of:

mapping said excess values image to form a mapped excess values image; and subtracting said mapped excess values image from said input image to form an input less mapped excess values image, wherein said low resolution image is obtained by downsampling said input less mapped excess values image, said residual image is obtained by subtracting said edge based image from said input less mapped excess values image, and said encoding of said excess values image encodes said mapped excess values image.

10. The method according to claim 2, wherein said edge run data comprises a set of edge runs with each said edge run comprising a sequence of pixel edge segments, a sign, and a sequence of pixel difference magnitudes.

11. The method according to claim 10, wherein said set of edge runs is a subset of calculated edge runs which pass a qualification test.

12. The method according to claim 11, where said qualification test for each said edge run comprises comparing of a sum of pixel difference magnitudes along said edge run with a threshold value.

13. The method according to claim 10, where said edge runs are calculated by a single pass through pixel corners in which, at each pixel corner, pairs of pixel edge segments at said pixel corner are linked by:

ranking pixel edge segments at said pixel corner, and linking the highest ranked pixel edge segment with the next highest ranked, compatible pixel edge segment.

14. The method according to claim 13, where said pixel edge segments at a corner are ranked using Laplacian pixel values and pixel difference magnitudes.

15. The method according to claim 1, wherein said input image is a tile of a larger image.

16. The method according to claim 1, wherein said forming an edge based image comprises convolving said image gradient data with at least two edge fields, wherein the sum of a difference of each edge field equals a unit impulse, and said edge fields have values which diminish in magnitude from a central position.

17. The method according to claim 16, wherein said image gradient data comprises horizontal edge data and vertical edge data.

18. The method according to claim 17, wherein said convolving comprises:
   convolving said horizontal edge data with a horizontal edge field to produce a horizontal edge image;
   convolving said vertical edge data with a vertical edge field to produce a vertical edge image; and
   combining said horizontal edge image with said vertical edge image.

19. A method according to claim 18, wherein said difference of the vertical edge field is a horizontal difference and said difference of the horizontal edge field is a vertical difference.

20. A method according to claim 18, wherein said convolutions are calculated scanline by scanline in a single pass through the scanlines of the image gradient data.

21. A method according to claim 18, wherein said convolutions are calculated by a downward pass and an upward pass through the scanlines of the image gradient data.

22. A method according to claim 17 in which said edge based image is produced scanline by scanline substantially as the sum of:
   a 1D convolution of a horizontal edge filter with the sum of previous scanline data of said edge based image and said horizontal edge data, and
   a 1D convolution of a vertical edge filter with said vertical edge data,
   wherein a difference of the vertical edge filter plus the horizontal edge filter equals a unit impulse.

23. The method according to claim 1, wherein said residual image is encoded using blockwise transform encoding.

24. A method of decompressing a compressed image to an output image, said method comprising:
   (a) decoding, from said compressed image, image gradient data, a low resolution image, and a residual image;
   (b) forming an edge based image from said image gradient data and said low resolution image; and
   (c) adding said edge based image to said residual image to form said output image.

25. A computer readable storage medium having a computer program recorded thereon, the program being executable by computer apparatus to perform a method of compressing an input image, said method comprising:
   a) extracting image gradient data from said input image, said image gradient data representing pixel differences along contours of said input image;
   (b) forming an edge based image from said image gradient data and a low resolution image derived from said input image;
   (c) computing a residual image representing a difference between said edge based image and said input image; and
   (d) compressing said input image by encoding said image gradient data, said low resolution image, and said residual image.

26. Computer apparatus comprising a processor and a storage device upon which a program is stored, the program being executable by the processor to compress an input image by:
   extracting image gradient data from said input image, said image gradient data representing pixel differences along contours of said input image;
   forming an edge based image from said image gradient data and a low resolution image derived from said input image;
   computing a residual image representing a difference between said edge based image and said input image; and
   compressing said input image by encoding said image gradient data, said low resolution image, and said residual image.

27. A computer readable storage medium having a computer program recorded thereon, the program being executable by computer apparatus to perform a method of decompressing a compressed image to an output image, said method comprising:
   (a) decoding, from said compressed image, image gradient data, a low resolution image, and a residual image;
   (b) forming an edge based image from said image gradient data and said low resolution image; and
   (c) adding said edge based image to said residual image to form said output image.

28. Computer apparatus comprising a processor and a storage device upon which a program is stored, the program being executable by the processor to decompress a compressed image to an output image by:
   (a) decoding, from said compressed image, image gradient data, a low resolution image, and a residual image;
   (b) forming an edge based image from said image gradient data and said low resolution image; and
   (c) adding said edge based image to said residual image to form said output image.

* * * * *